United States Patent
Dabholkar et al.

(10) Patent No.: US 11,188,745 B2
(45) Date of Patent: Nov. 30, 2021

(54) ENHANCING ELECTRONIC DOCUMENTS FOR CHARACTER RECOGNITION

(71) Applicant: AT&T Intellectual Property I, L.P., Atlanta, GA (US)

(72) Inventors: Abhay Dabholkar, Allen, TX (US); Caitlin Rose Gruis, Richardson, TX (US); Parth Manoj Sutaria, Wylie, TX (US); Nutan M. Ranoliya, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 130 days.

(21) Appl. No.: 16/570,988

(22) Filed: Sep. 13, 2019

(65) Prior Publication Data
US 2021/0081661 A1 Mar. 18, 2021

(51) Int. Cl.
*G06K 9/00* (2006.01)
*G06T 5/00* (2006.01)
(Continued)

(52) U.S. Cl.
CPC ....... *G06K 9/00463* (2013.01); *G06F 40/232* (2020.01); *G06F 40/253* (2020.01);
(Continued)

(58) Field of Classification Search
CPC ............ G06K 9/40; G06K 9/32; G06K 9/228; G06K 9/6423; G06K 9/18; G06K 9/20;
(Continued)

(56) References Cited

U.S. PATENT DOCUMENTS

| | | | | |
|---|---|---|---|---|
| 4,945,502 A | * | 7/1990 | Kwon | G06T 5/20 348/607 |
| 5,526,446 A | * | 6/1996 | Adelson | G06K 9/40 382/260 |

(Continued)

OTHER PUBLICATIONS

"Abbyy," https://www.abbyy.com/en-us/, 6 pages.
(Continued)

*Primary Examiner* — Amir Alavi
(74) *Attorney, Agent, or Firm* — Amin, Turocy & Watson, LLP

(57) ABSTRACT

Techniques for desirably translating a document image to an editable electronic textual document are presented. Utilizing respective applications, a document processing management component (DPMC) can convert the document image to a grayscale document image, remove noise from such image, rotate such image to reduce or eliminate any skewing of such image, and perform character recognition on the rotated grayscale document image to extract the textual information from such document to generate an electronic textual document. DPMC can associate a document identifier with the electronic textual document, and such document and document identifier can be stored in a data store. When such document is related to a device or other item, a code or textual string can be associated with the device or item,
(Continued)

wherein a communication device can scan the code or textual string. In response, DPMC can retrieve such document, or information relating thereto, from the data store.

20 Claims, 10 Drawing Sheets

(51) Int. Cl.
    *G06T 5/50*     (2006.01)
    *G06T 3/60*     (2006.01)
    *G06K 9/34*     (2006.01)
    *G06T 3/00*     (2006.01)
    *G06F 40/232*     (2020.01)
    *G06F 40/253*     (2020.01)

(52) U.S. Cl.
    CPC ............ *G06K 9/344* (2013.01); *G06T 3/0006* (2013.01); *G06T 3/608* (2013.01); *G06T 5/002* (2013.01); *G06T 5/003* (2013.01); *G06T 5/50* (2013.01)

(58) Field of Classification Search
    CPC .... G06K 9/344; G06K 9/00463; G06T 5/001; G06T 5/20; G06T 5/004; H04N 1/409; H04N 1/4092; H04N 1/4097; H04N 7/26888
See application file for complete search history.

(56) References Cited

U.S. PATENT DOCUMENTS

| | | | | |
|---|---|---|---|---|
| 5,559,902 | A * | 9/1996 | Bose | G06K 9/40 382/262 |
| 5,563,963 | A * | 10/1996 | Kaplan | G06T 5/002 358/463 |
| 5,594,815 | A | 1/1997 | Fast et al. | |
| 6,028,957 | A * | 2/2000 | Katori | G06T 5/20 358/530 |
| 6,195,467 | B1 * | 2/2001 | Asimopoulos | G06T 5/20 382/192 |
| 6,731,823 | B1 * | 5/2004 | Gallagher | H04N 1/4092 358/521 |
| 6,990,252 | B2 * | 1/2006 | Shekter | G06K 9/40 358/453 |
| 7,119,837 | B2 * | 10/2006 | Soupliotis | H04N 5/23248 348/208.99 |
| 7,599,572 | B2 * | 10/2009 | Shekter | G06K 9/40 358/463 |
| 8,229,245 | B2 * | 7/2012 | Mallat | G06T 5/10 382/275 |
| 8,300,979 | B2 * | 10/2012 | Ordentlich | G06K 9/40 382/275 |
| 2018/0324438 | A1 * | 11/2018 | Kwak | H04N 19/86 |

OTHER PUBLICATIONS

"Edgeverve," https://www.edgeverve.com/artificial-intelligence/nia/, 12 pages.

* cited by examiner

ENHANCING ELECTRONIC DOCUMENTS FOR CHARACTER RECOGNITION

TECHNICAL FIELD

The subject disclosure relates generally to electronic document processing, e.g., to enhancing electronic documents for character recognition.

BACKGROUND

Physical documents can be scanned using devices, such as scanners (e.g., stand-alone scanner or printer/scanner), communication devices (e.g., mobile phones), or other devices with scanning or photographic capabilities. Typically, with regard to a scanned document, the text of the scanned document is not editable or retrievable from the scanned document because the text and the background of the document are part of the same layer.

It sometimes can be desired though to be able to edit or retrieve (e.g., copy) text from a scanned document. Optical character recognition (OCR) techniques or OCR devices can be employed to extract text from a scanned document. However, there can be issues with regard to extracting text from scanned documents using OCR techniques, as, for example, there can be undesirable noise (e.g., shaded areas, highlighted areas, or stray marks) in a scanned document due to noise in the document that was scanned or noise introduced into the scanned document during scanning by the scanning device, the scanned document can be skewed due to the way in which the document was scanned by the scanning device, and/or the scanning device or scanning application can be of relatively low quality (e.g., low contrast OCR application). Noise issues, skewing issues, low quality OCR application issues, and/or other undesired scanning issues can negatively impact extracting text from the scanned document using OCR techniques and can result in translation errors with regard to the identifying of text in and extracting of the text from the scanned document.

The above-described description is merely intended to provide a contextual overview relating to electronic document processing, and is not intended to be exhaustive.

BRIEF DESCRIPTION OF THE DRAWINGS

Various non-limiting embodiments are further described with reference to the accompanying drawings in which.

DETAILED DESCRIPTION

Figure 1:
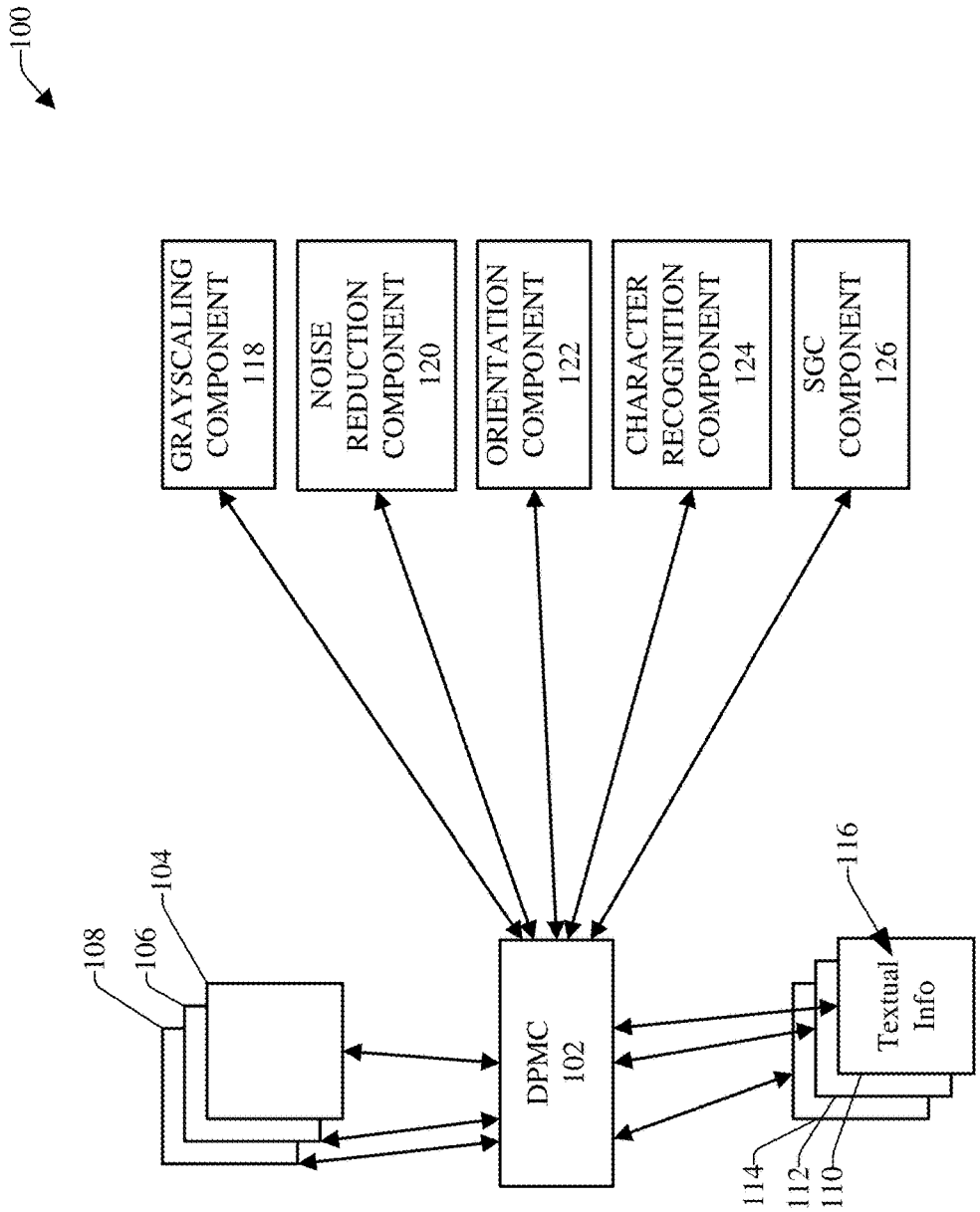
FIG. 1 depicts a block diagram of an example, non-limiting system that can desirably translate an image of a document to generate an electronic textual document that can comprise editable and searchable textual information, in accordance with various aspects and embodiments of the disclosed subject matter.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular network environment or standard).

Discussed herein are various aspects that relate to desirably pre-processing an images (e.g., electronic document), such as a scanned or photographed image, of or representing a document (e.g., physical document) in connection with translating the document image to generate an electronic textual document comprising text (e.g., editable text) extracted from the document image. The disclosed subject matter can significantly improve the accuracy of translation of document images to generate electronic textual documents comprising text, as compared to traditional techniques, systems, and methods of translating document images to electronic textual documents.

Optical character recognition (OCR) techniques or OCR devices can be employed to extract text from a scanned document. However, there can be issues with regard to extracting text from scanned documents using OCR techniques, as, for example, there can be undesirable noise (e.g., shaded areas, highlighted areas, or stray marks) in a scanned document due to noise in the document that was scanned or noise introduced into the scanned document during scanning by the scanning device, the scanned document can be skewed (e.g., out of alignment) due to the way in which the document was scanned by the scanning device, and/or the scanning device or scanning application can be of relatively low quality (e.g., low contrast OCR application). Noise issues, skewing issues, low quality OCR application issues, and/or other undesired scanning issues can negatively impact extracting text from the scanned document using OCR techniques and can result in translation errors with regard to the identifying of text in and extracting of the text from the scanned document.

The disclosed subject matter can overcome these and other problems associated with translating scanned documents to generate electronic textual documents comprising text (e.g., extracted and/or editable text). To that end, the disclosed subject matter presents techniques, methods, and systems that can desirably translate an image of a document to an editable and searchable electronic textual document. With regard to an image of a scanned or photographed document (e.g., physical document), the disclosed subject matter can comprise a document processing management component (DPMC) that can employ and control respective applications (e.g., open source applications) to perform desirable pre-processing of the document image (e.g., prior to translation) and/or desirable post-processing of the document image (e.g., after translation) to accurately translate the document image to generate an electronic textual document, comprising textual information (e.g., editable and/or searchable text extracted from the document image). In accordance with various embodiments, the DPMC can receive a document image of a scanned or photographed document from a communication device with scanning or photographic functionality (e.g., via a communication network) or a communication device, comprising the DPMC, can scan or photograph a document to generate the document image.

As part of the pre-processing of the document image, the DPMC can employ and control a grayscaling application to have the grayscaling application convert the document image (e.g., scanned or photographed image of the document) from a color image to a grayscale document image based at least in part on a set of grayscale parameters, including one or more threshold grayscale values. One problem with regard to the document image is that there may be some noise in the document image. The DPMC can employ and control a noise reduction application to have the noise reduction application identify noise in the grayscale document image and modify the grayscale document image to remove such noise from the grayscale document image based at least in part on a set of noise parameters, including one or more threshold noise values (e.g., threshold noise reduction values), to generate a modified document image.

Another problem with regard to the document image is that is that the document may have been scanned or photographed at an angle or in such a way that the document image can be skewed at an angle, which can result in translation errors. The DPMC can employ and control an orientation application to have the orientation application determine the amount of skew from a desired defined angle that the modified document image has and can rotate the modified document image to reduce or eliminate the amount of skewing of the modified document image, based at least in part on a set of rotation (e.g., orientation) parameters, including one or more threshold rotation (e.g., orientation) values (e.g., threshold skew reduction values), to generate a rotated document image (e.g., a grayscale, noise-reduced, rotated document image), in accordance with (e.g., to satisfy) a defined document processing criterion relating to skew reduction.

The pre-processing (e.g., grayscaling, noise reduction or removal, and/or de-skewing) can prepare the pre-processed document image (e.g., a grayscale, noise-reduced, rotated document image) for translation. The DPMC can employ and control a character recognition (e.g., OCR) application to have the character recognition application perform character recognition on the rotated grayscale document image to extract textual information (e.g., textual characters) from the rotated grayscale document image to generate an electronic textual document comprising textual information (e.g., editable and/or searchable text) based at least in part on character recognition parameters, including one or more threshold character recognition values. The textual information of the electronic textual document can be editable (e.g., using a word processing application) and/or searchable (e.g. using a search engine to search the textual information of the electronic textual document). During pre-processing or processing of a document image, the DPMC or the various document processing (e.g., pre-processing or processing) applications can determine the respective parameters to be utilized with regard to the respective applications to process the document image to generate the electronic textual document, based at least in part on results of an analysis of the document image (e.g., by the DPMC or respective document processing applications) and/or user input (e.g., indicating or specifying respective parameter values of the respective parameters) received from a user via a communication device or the DPMC.

In some embodiments, the disclosed subject matter can perform desired post-processing of the electronic textual document, such as performing spell checking or grammar checking of the textual information of the electronic textual document. For instance, there may be some spelling and/or grammatical errors in the textual information of the electronic textual documents due in part to translation issues during the character recognition and text extraction process (e.g., the character recognition application incorrectly identifies the letter "e" as the letter "c" in a word). The DPMC can employ and control a spelling and grammar check application to have the spelling and grammar check application perform spell checking and grammar checking on the textual information of the electronic textual document to detect and correct any spelling or grammar errors in the textual information of the electronic textual document.

The DPMC can store the electronic textual document (e.g., with or without post-processing being performed) in a data store, wherein the DPMC also can store other electronic textual documents, including electronic textual documents derived (e.g., translated) from scanned or photographed document images, in the data store. In certain embodiments, with regard to each electronic textual document, the DPMC can associate metadata, such as a document identifier, with the electronic textual document, and the electronic textual document and associated metadata can be stored in the data store. The metadata can enable the DPMC to identify and retrieve the electronic textual document, or information relating thereto, based at least in part on the metadata (e.g., when a communication device presents the document identifier or identification information relating to the document identifier to the DPMC). The DPMC also can search the textual information of the electronic textual document, in response to receiving a search query, comprising a search term(s) (e.g., keyword(s)), from a communication device to determine whether the electronic textual document is responsive to the search query and, if it is responsive, to retrieve the electronic textual document, or information relating thereto, from the data store and present the electronic textual document, or information relating thereto, to the communication device.

With further regard to the metadata associated with the electronic textual document, for example, the electronic textual document (e.g., contract, user manual, safety manual, maintenance or repair manual, or device or product specifications, . . . ) can be related to a device, product, or other item, and a code (e.g., bar code, quick response (QR) code, or radio frequency identification (RFID)) or textual string can be associated with the device, product or item, wherein the code or textual string can comprise the document identifier associated with (e.g., linked to) the electronic textual document. A communication device can scan or otherwise capture the code or textual string on or associated with the device, product, or other item, and can communicate the code or textual string, or information (e.g., document identifier) relating thereto, to the DPMC. In response, the DPMC can search the data store and identify the electronic textual document in the data store based at least in part on the code or textual string, or information relating thereto. The DPMC can retrieve the electronic textual document, or information relating thereto, from the data store and can present (e.g., communicate) the electronic textual document, or the information relating thereto, to the communication device and associated user.

The disclosed subject matter, employing the DPMC and the respective applications, to pre-process a document image, translate a pre-processed document image to generate an electronic textual document, and/or post-process the electronic textual document, such as described herein, can enhance (e.g., improve, increase, or optimize) the accuracy and/or efficiency of translation of document images (e.g., scanned or captured document images) of documents, as compared to traditional techniques, systems, or methods for translating document images.

These and other aspects and embodiments of the disclosed subject matter will now be described with respect to the drawings.

FIG. 1 depicts a block diagram of an example, non-limiting system 100 that can desirably (e.g., accurately and efficiently) translate an image of a document to generate an electronic textual document that can comprise editable and searchable textual information, in accordance with various aspects and embodiments of the disclosed subject matter. The system 100 can comprise a document processing management component (DPMC) 102 that can control respective applications (e.g., open source applications) to perform desirable pre-processing of a document image (e.g., an image of a scanned or photographed document) of a document (e.g., prior to translation) and/or desirable post-processing of the image of the document (e.g., after translation) to desirably (e.g., accurately and efficiently) translate the image of the document to generate an electronic textual document, comprising textual information (e.g., editable and/or searchable text extracted from the image of the document). In accordance with various embodiments, the DPMC 102 can receive document images of scanned or photographed documents, such as, for example, document images 104, 106, and/or 108, from a communication device (not shown in FIG. 1; as more fully described herein) with scanning or photographic functionality (e.g., via a communication network) or a communication device, comprising the DPMC 102, can scan or photograph documents to create the document images (e.g., 104, 106, and/or 108). The document images can be of respective single-page documents or can be respective pages of a multi-page document.

The system 100 can comprise and utilize a number of applications (e.g., open source applications) to facilitate performing the translation of respective document images (e.g., 104, 106, and/or 108) to generate respective electronic textual documents (e.g., 110, 112, and/or 114) comprising respective editable and/or searchable textual information, such as, for example the textual information 116 of electronic textual document 110. The system 100 can comprise a grayscaling component 118 that can be or can comprise a grayscaling application that can be utilized to convert color (e.g., a red, green, blue color model or other color model) or non-color document images, such as document images 104, 106, and/or 108, to grayscale document images, based at least in part on a set of grayscaling parameters relating to grayscaling of a document image. The DPMC 102 can be associated with (e.g., communicatively connected to) the grayscaling component 118 and associated grayscaling application. In some embodiments, the grayscaling application can be an open source grayscaling application, whereas, in other embodiments, the grayscaling application can be a closed source or proprietary grayscaling application. With regard to a document image (e.g., 104), the DPMC 102 or the grayscaling component 118 (or associated grayscaling application) can determine the respective grayscaling parameters of the set of grayscaling parameters to be utilized with regard to the grayscaling application to process the document image (e.g., 104) to generate the electronic textual document (e.g., 110), based at least in part on results of an analysis of the document image (e.g., by the DPMC 102 or the grayscaling component 118 (or associated grayscaling application)) and/or user input (e.g., indicating or specifying respective parameter values of the respective grayscaling parameters) received from a user via a communication device or the DPMC 102.

Figure 2:
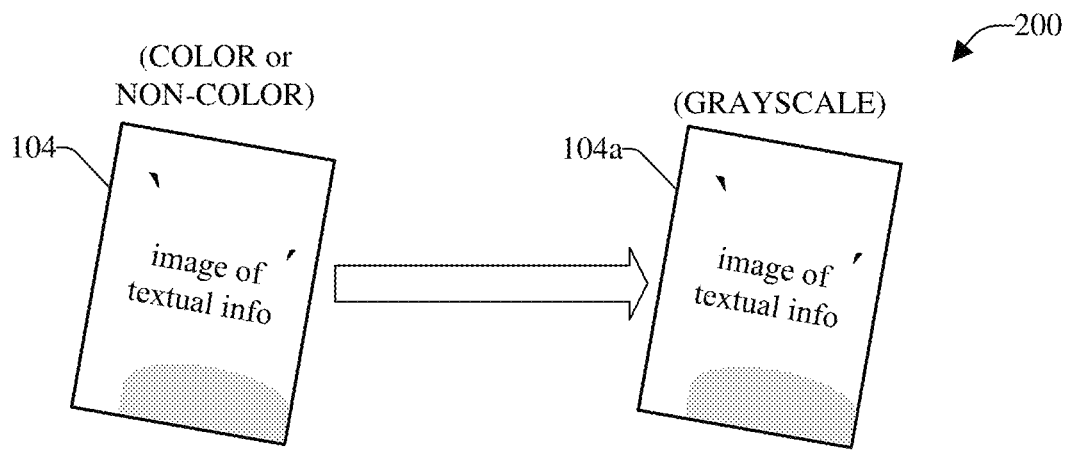
FIG. 2 depicts a block diagram of an example, non-limiting grayscale conversion of a color or non-color document image to a grayscale document image, in accordance with various aspects and embodiments of the disclosed subject matter.

Referring briefly to FIG. 2 (along with FIG. 1), FIG. 2 depicts a block diagram of an example, non-limiting grayscale conversion 200 of a color or non-color document image 104 to a grayscale document image 104a, in accordance with various aspects and embodiments of the disclosed subject matter. As part of the pre-processing of a document image 104, the DPMC 102 can employ and control operation of the grayscaling component 118 and the associated grayscaling application to have the grayscaling application convert the document image 104 from a color or non-color image to a grayscale document image 104a based at least in part on the set of grayscale parameters, including one or more threshold grayscale values.

In some embodiments, the DPMC 102 can control operation of the grayscaling application using or in accordance with the following example instructions, code, pseudocode, algorithms, and associated parameter and/or threshold values, for converting a document image from color to grayscale:

Module to convert colored images to grayscale for processing open image
    1: pass to main application
        Convert to COLOR_RGB2GRAY
        return grayscaled image 2: pass to main application
   Add adaptive Guassian threshold with following tuned parameters
      image (grayscaled image): output from pass 1 above
      maxValue (remove the gray to white): 255 #
      adaptiveMethod (Adaptive thresholding algorithm to use):
      cv2.ADAPTIVE_THRESH_GAUSSIAN_C,
      thresholdType (Thresholding type): cv2.THRESH_BINARY
      The function transforms a grayscale image to a binary image according to the formulae:

$$\[dst(x,y)=\fork{\texttt{maxValue}}{if \(src(x,y)>T(x,y)\)}{0}{otherwise}\]$$

blockSize (Size of a pixel neighborhood that is used to calculate a threshold value for the pixel): 11
      C (Constant subtracted from the mean or weighted mean): 2 return processed image.

In some embodiments, as part of converting the document image 104 to the grayscale document image 104a, the DPMC 102 can control operation of the grayscaling application to convert the grayscaled image to a binary image such that the grayscale document image 104a can be a binary grayscaled document image.

One problem with regard to document images is that there often can be some noise in the document images. The system 100 can comprise a noise reduction component 120 that can be or can comprise a noise reduction application that can be utilized to reduce or eliminate noise in document images (e.g., document images 104 or 104a, 106, and/or 108), to generate modified (e.g., noise-reduced) document images. The DPMC 102 can be associated with (e.g., communicatively connected to) the noise reduction component 120 and associated noise reduction application. In some embodiments, the noise reduction application can be an open source noise reduction application, whereas, in other embodiments, the noise reduction application can be a closed source or proprietary noise reduction application. The DPMC 102 can employ and control operation of the noise reduction component 120 and the associated noise reduction application to have the noise reduction application identify noise in grayscale document images (e.g., grayscale document image 104a) and modify the grayscale document images to remove such noise from the grayscale document images based at least in part on a set of noise parameters, including one or more threshold noise values (e.g., threshold noise reduction values), to generate modified document images.

Figure 3:
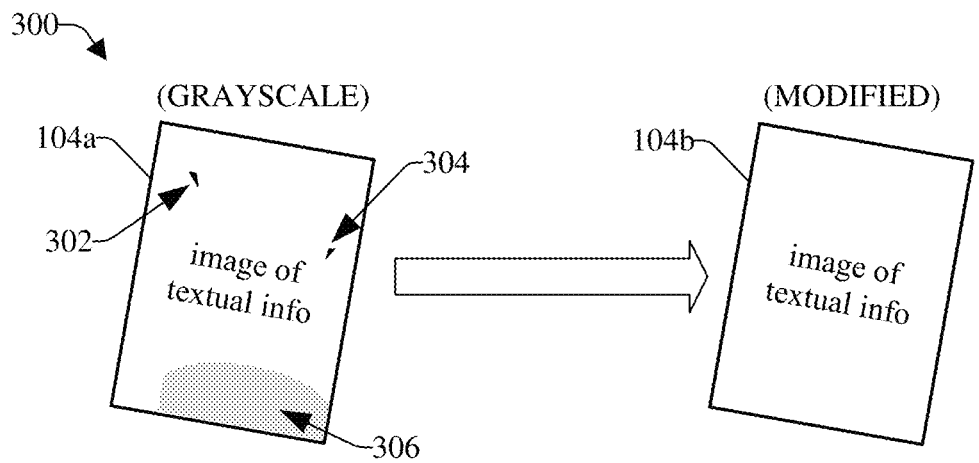
FIG. 3 illustrates a block diagram of an example, non-limiting noise-reduction modification of a grayscale document image to a modified (e.g., grayscaled and noise-reduced) document image, in accordance with various aspects and embodiments of the disclosed subject matter.

Referring briefly to FIG. 3 (along with FIG. 1), FIG. 3 illustrates a block diagram of an example, non-limiting noise-reduction modification 300 of a grayscale document image 104a to a modified (e.g., grayscaled and noise-reduced) document image 104b, in accordance with various aspects and embodiments of the disclosed subject matter. There can be undesired noise in document images, such as the grayscale document image 104a. It can be desirable to remove, reduce, and/or eliminate such undesired noise to facilitate improving translation of the document image to extract textual information from the document image and generate an electronic textual document comprising such textual information. The noise in the grayscale document image 104a can comprise, for example, one or more stray marks, such as stray mark 302 and/or stray mark 304, in the grayscale document image 104a, a shaded region 306 in the grayscale document image 104a, and/or other types of noise in the grayscale document image 104a. With regard to the stray marks (e.g., stray marks 302 and/or 304), sometimes when a document is being scanned or photographed, there can be stray marks, particles, or objects on the physical document and/or there can be particles, objects, or other noise-causing entities or agents that can be on or in the scanning or photographing device (e.g., on the lens or scanning surface of the device) that can result in stray marks (e.g., stray marks 302 and/or 304) appearing in the document image. With regard to the shaded region 306, sometimes when a document is being scanned or photographed, the lighting can be uneven (e.g., due in part to the scanning or photographing device and/or user partially blocking a light source in the room), which can result in a portion of the background (e.g., non-text area) of the document image being brighter or whiter than another portion of the background, which can be relatively darker or shaded (e.g., shaded region 306).

As managed by the DPMC 102, the noise reduction component 120, employing the noise reduction application, can analyze the grayscale document image 104a to identify or determine noise in the grayscale document image 104a. Based at least in part on the results of the analysis of the grayscale document image 104a, the DPMC 102 and/or the noise reduction component 120 can identify or determine the noise in the grayscale document image 104a, such as, for example, identifying or determining that the grayscale document image 104a contains various items of noise, including the stray mark 302, stray mark 304, and/or shaded region 306, and/or determining respective noise reduction parameters to utilize with regard to the noise reduction application to reduce, minimize, or eliminate the various items of noise in or from the grayscale document image 104a. The DPMC 102 or noise reduction component 120 can determine the respective noise reduction parameters based at least in part on the analysis results and/or user input (e.g., indicating or specifying respective parameter values of the respective noise reduction parameters) received from the user via the communication device or the DPMC 102. The noise reduction component 120, as managed by the DPMC 102, can modify the grayscale document image 104a to remove or reduce the various items of noise, including the stray mark 302, stray mark 304, and/or shaded region 306, from or in the grayscale document image 104a, and/or sharpen the grayscale document image 104a, to generate a modified (e.g., grayscaled and noise-reduced) document image 104b, based at least in part on the set of noise parameters, including one or more threshold noise values (e.g., threshold noise reduction values), in accordance with the defined document processing criteria.

In certain embodiments, the DPMC 102 can control operation of the noise reduction application using or in accordance with the following example instructions, code, pseudocode, algorithms, and associated parameter and/or threshold values, for removing or reducing noise from or in an image of a document (e.g., removing or reducing noise from or in the grayscale document image 104a), and/or sharpening the grayscale document image 104a, to generate the modified document image 104b:

3: pass to main application
   Perform Guassian blur and OTSU thresholding to remove noise
      Image (processedimage): output from pass 2 above
      Ksize (Gaussian kernel size.width and ksize.height can differ but they both are to be positive and odd; or they can be zeros and then they can be computed from sigma.): (3,3)
      sigmaX (Gaussian kernel standard deviation in X direction): 0.

Another problem with regard to the document image is that is that the document may have been scanned or photographed at an angle or in such a way that the document image can be skewed at an angle, which can result in undesirable translation errors. In some embodiments, the system 100 can comprise an orientation component 122 that can be or can comprise an orientation application that can be utilized to rotate or adjust the orientation of a document image (e.g., modified document image 104*b*) to reduce an amount of skew of the document image to generate a rotated document image 104*c* (e.g., a grayscale, noise-reduced, rotated document image). The DPMC 102 can be associated with (e.g., communicatively connected to) the orientation component 122 and associated orientation application. In certain embodiments, the orientation application can be an open source orientation application, and, in other embodiments, the orientation application can be a closed source or proprietary orientation application.

Figure 4:
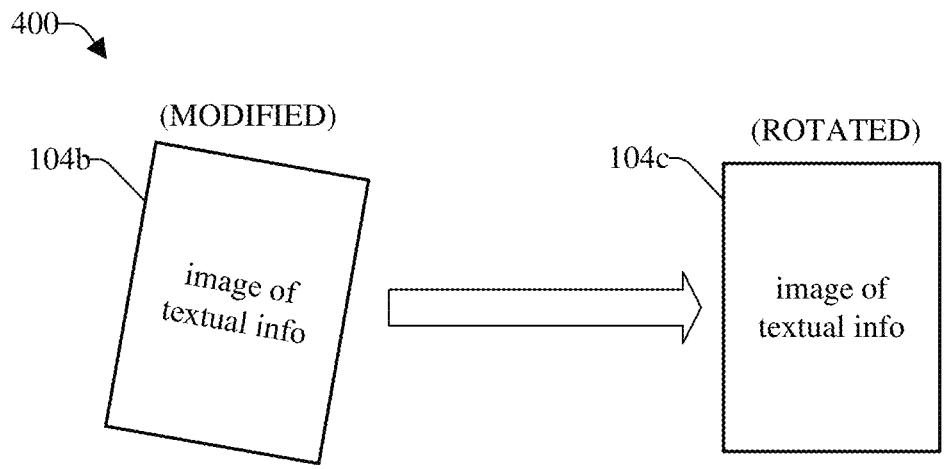
FIG. 4 presents a block diagram of an example, non-limiting document rotation of a modified (e.g., grayscaled and noise-reduced) document image to a rotated document image (e.g., a grayscaled, noise-reduced, and rotated document image), in accordance with various aspects and embodiments of the disclosed subject matter.

Turning briefly to FIG. 4 (along with FIG. 1), FIG. 4 presents a block diagram of an example, non-limiting document rotation 400 of a modified (e.g., grayscaled and noise-reduced) document image 104*b* to a rotated document image 104*c* (e.g., a grayscaled, noise-reduced, and rotated document image), in accordance with various aspects and embodiments of the disclosed subject matter. The DPMC 102 can control operation of the orientation component 122 and the associated orientation application to have the orientation application determine an amount of skew (e.g., an amount of deviation) from a desired defined angle 402 that the modified document image 104*b* has and can rotate the modified document image 104*b* to reduce or eliminate the amount of skewing of the modified document image 104*b* from the defined angle 402, based at least in part on a set of rotation (e.g., orientation) parameters, including one or more threshold rotation (e.g., orientation) values (e.g., threshold skew reduction values), to generate a rotated document image 104*c* (e.g., a grayscale, noise-reduced, rotated document image), in accordance with (e.g., to satisfy) a defined document processing criterion relating to skew reduction. The DPMC 102 or orientation component 122 can determine the respective rotation parameters of the set of rotation parameters, including threshold values, based at least in part on the results of analyzing the modified document image 104*b* and/or user input (e.g., indicating or specifying respective parameter values of the respective rotations parameters) received from the user via the communication device or the DPMC 102. The rotated document image 104*c* can be aligned, or at least substantially aligned, with the defined angle 402.

In certain embodiments, the DPMC 102 can control operation of the orientation application using or in accordance with the following example instructions, code, pseudocode, algorithms, and associated parameter and/or threshold values, for rotating or re-orienting an image (e.g., modified document image 104*b*) of a document (e.g., rotating or re-orienting a grayscaled and modified (e.g., modified to remove noise) image of a document) to generate the rotated document image 104*c*:

4:
    4.1: pass to main application
        Canny edge detection before hue lines are drawn on the copied image
        image (Processed so far image): output from pass 3
        lowerThreshold (integrity gradient and 100 for black to convert all pixels to black): 100
        high Threshold (integrity gradient and 100 for black to convert all pixels to black): 100
        apertureSize (default parameter to find image gradients): 3
    4.2: pass to main application
        Draw hue lines using HoughLinesP
        img_edges (image from pass 4.1 processing):image
        rho (Distance resolution of the accumulator in pixels, default): 1
        dataThet (Angle resolution of the accumulator in radian): math.pi/180
        threshold (Accumulator threshold parameter. Only those lines that are returned that get enough votes): 100
        minLineLength (only consider longer lines than 100 pixels)=100
        maxLineGap (word spacing between 2 words/lines is less than n pixels to consider two lines)=5
    4.3: pass to second application
        iteration through hue lines and identifying the angle between that line and the tangent line to the page.
        take the median of each line and rotate to that number)
    4.5: pass to character recognition application
        check if image is 180 degrees rotated.
5: ready to process the image through the character recognition application.

With further regard to FIG. 1, with the pre-processing (e.g., grayscaling, noise reduction, and skew reduction) completed on the document image, the DPMC 102 can translate the document image to identify and extract textual information from the document image. In some embodiments, the DPMC 102 can employ and control a character recognition component 124 and associated character recognition (e.g., OCR) application to have the character recognition application perform character recognition on the rotated document image 104*c* to extract textual information 116 (e.g., textual characters, such as letters, numbers, or symbols) from the rotated document image 104*c* to generate an electronic textual document 110 comprising textual information 116 (e.g., editable and/or searchable text) based at least in part on character recognition parameters, including one or more threshold character recognition values. The DPMC 102 or character recognition component 124 can determine the respective character recognition parameters based at least in part on the results of analyzing the rotated document image 104*c* and/or user input (e.g., indicating or specifying respective parameter values of the respective character recognition parameters) received from the user via the communication device or the DPMC 102. The textual information 116 of the electronic textual document 110 can be editable (e.g., using a word processing application) and/or searchable (e.g. using a search engine to search the textual information 116 of the electronic textual document 110). In some embodiments, the character recognition application can be an open source character recognition application, and, in other embodiments, the character recognition application can be a closed source or proprietary character recognition application.

As desired, the disclosed subject matter also can perform desired post-processing of an electronic textual document (e.g., 110, 112, and/or 114), such as performing spell checking or grammar checking of the textual information (e.g., 116) of the electronic textual document. For instance, there may be some spelling and/or grammatical errors in the textual information (e.g., 116) of the electronic textual documents (e.g., 110, 112, and/or 114) due in part to translation issues during the character recognition and text extraction process (e.g., the character recognition application incorrectly identifies the letter "e" as the letter "c" in a word, or incorrectly identifies the letter "1" as the number "1", . . . ). The DPMC 102 can employ and control a spelling and grammar checking (SGC) component 126 and associated spelling and grammar check application to have the spelling and grammar check application perform spell checking and grammar checking on the textual information (e.g., 116) of the electronic textual document (e.g., 110) to detect and correct any spelling or grammar errors in the textual information (e.g., 116) of the electronic textual document (e.g., 110).

The DPMC 102 can store the electronic textual documents (e.g., 110, 112, and/or 114) in a data store (not shown in FIG. 1; as more fully described herein). The DPMC 102 also can retrieve electronic textual documents (e.g., 110, 112, and/or 114), and/or information relating thereto, from the data, in response to search queries or document identifiers associated with the electronic textual documents that can be received from communication devices, as more fully described herein.

Figure 5:
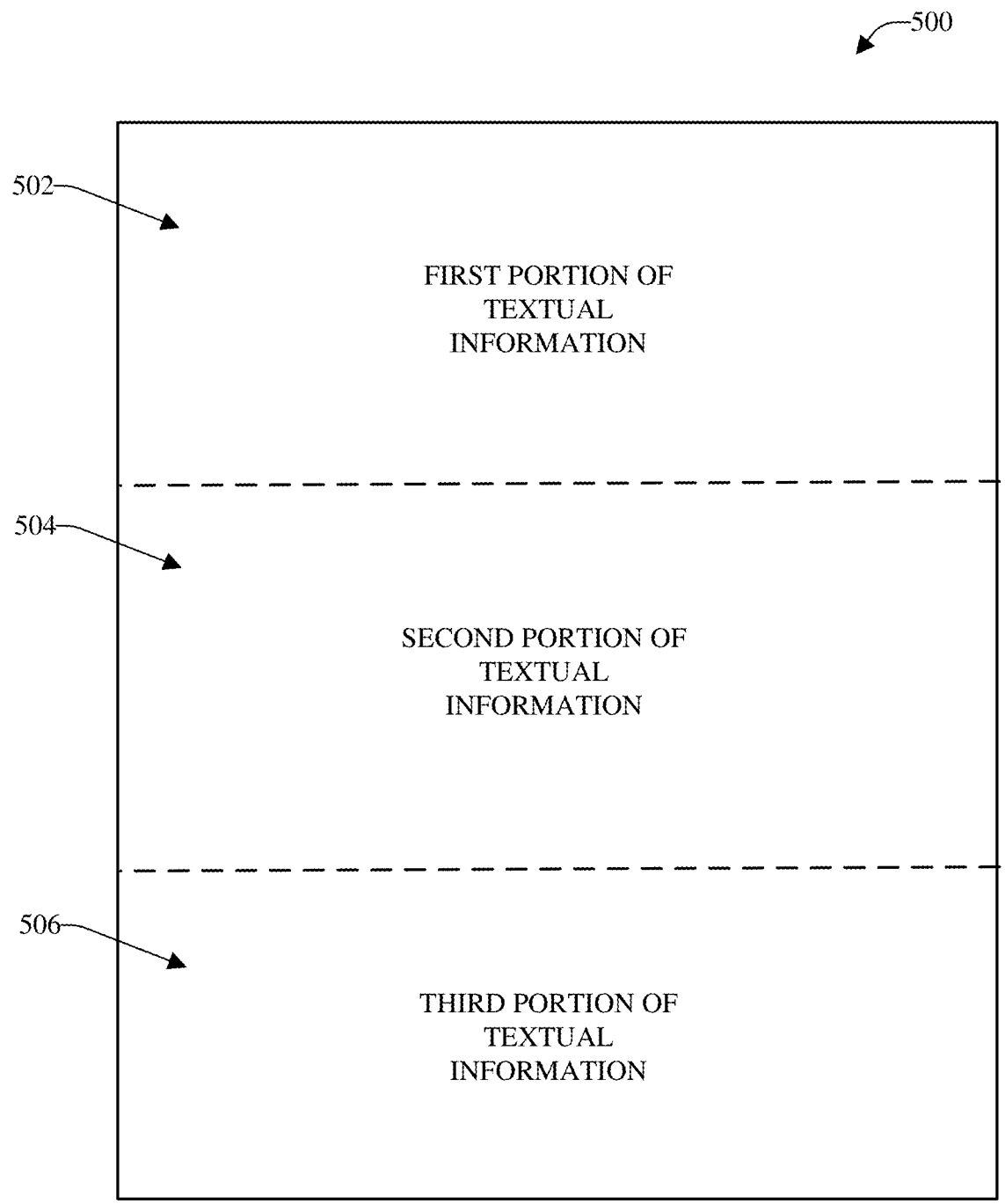
FIG. 5 depicts a block diagram of an example, non-limiting document image that can be partitioned into multiple subsections that can be processed in parallel, in accordance with various aspects and embodiments of the disclosed subject matter.

In accordance with various embodiments, the disclosed subject matter, employing the DPMC 102, grayscaling component 118, noise reduction component 120, orientation component 122, character recognition component 124, and/or SGC component 126, and the respective associated applications, can perform multiple (e.g., two or more) operations relating to pre-processing, translating, and/or post-processing of documents images (e.g., 104, 106, and/or 108) on respective portions of a document image (e.g., 104) or on multiple document images (e.g., 104, 106, and/or 108) in parallel and/or simultaneously. Referring briefly to FIG. 5 (along with FIG. 1), FIG. 5 depicts a block diagram of an example, non-limiting document image 500 that can be partitioned into multiple subsections that can be processed in parallel, in accordance with various aspects and embodiments of the disclosed subject matter. The DPMC 102 can partition the document image 500 into a desired number of subsections, such as, for example, image subsection 502 comprising a first portion of textual information of the document image 500, image subsection 504 comprising a second portion of the textual information, and/or image subsection 506 comprising a third portion of the textual information. It is to be appreciated and understood that such partitioning of the document image 500 and the size and shape of the image subsections (e.g., 502, 504, 506) are merely exemplary, and, in accordance with the disclosed subject matter, the DPMC 102 can partition the document image 500 into virtually any desired number of subsections having virtually any desired shapes (e.g., regular or irregular shapes) and sizes.

In some embodiments, to facilitate desirably partitioning the document image 500, the DPMC 102, or an associated application, typically can identify areas of the document image 500 that do not include textual information and can place one or more partitions in such areas of the document image 500, which can maintain respective characters of the textual information in whole form, instead of having a character split between different partitions. In other embodiments, the DPMC 102 can partition the document image 500 such that a character may be split between different subsections of the document image 500, and can still perform parallel processing, including facilitating translating the textual information (and including the character) and identifying and extracting the character and other textual information, even though the character was split between the different subsections.

The DPMC 102 can control operation of respective components (e.g., grayscaling component 118, noise reduction component 120, orientation component 122, character recognition component 124, and/or SGC component 126) and respectively associated applications to perform a first operation on image subsection 502 using a first application of such applications, a second operation on image subsection 504 using a second application of such applications, and/or a third operation on image subsection 506 using a third application of such applications, in parallel and/or simultaneously. As a non-limiting example, the DPMC 102, the grayscaling component 118, and the noise reduction component 120 can have performed pre-processing on the image subsection 502 to convert the image subsection 502 to grayscale and remove noise from the image subsection 502, and the DPMC 102 and the grayscaling component 118 can have performed pre-processing on the image subsection 504 to convert the image subsection 504 to grayscale (e.g., in parallel with the DPMC 102 employing the noise reduction component 120 to remove noise from the image subsection 502). At this point, as desired, the DPMC 102 can employ the orientation component 122 and associated orientation application to rotate the image subsection 502 to reduce, minimize, or eliminate any skewing of the image subsection 502, the DPMC 102 can employ the noise reduction component 120 and associated noise reduction application to remove noise from the image subsection 504, and the DPMC 102 can employ the grayscaling component 118 and associated grayscaling application to convert the image subsection 506 to grayscale, in parallel and/or simultaneously.

In some instances, there can be document images that can include textual information and other types of information, such as visual content (e.g., photograph, drawing, artwork, or logo, . . . ). A user may or may not desire to process or preserve such other information. For instance, in some cases, a user may only be interested in the textual information of a document. In accordance with various embodiments, the DPMC 102 can control operation of the respective components and respectively associated applications to identify an area(s) (e.g., region(s)) of a document image (e.g., 104) that contains visual content, can isolate such area comprising the visual content from other areas of the document image that contain textual information, and/or can disregard such visual content or separately (e.g., differently) process such visual content from the processing of the textual information, to facilitate desirably (e.g., accurately) translating the document image and extracting the textual information from the document image to produce an electronic textual document (e.g., 110) comprising the textual information (e.g., 116).

Figure 6:
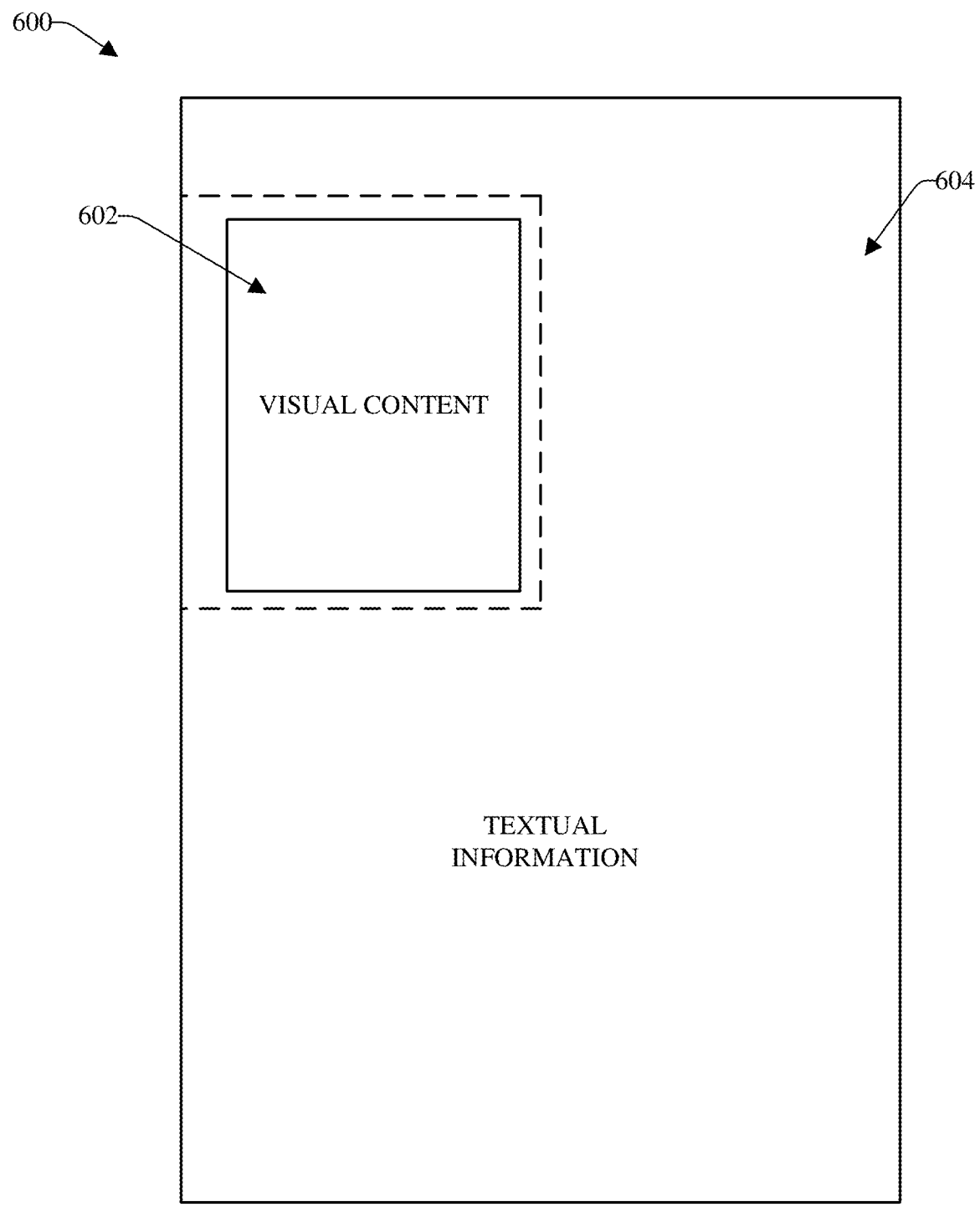
FIG. 6 presents a block diagram of an example, non-limiting document image that can comprise textual information and visual content, in accordance with various aspects and embodiments of the disclosed subject matter.

Turning briefly to FIG. 6 (along with FIG. 1), FIG. 6 presents a block diagram of an example, non-limiting document image 600 that can comprise textual information and visual content, in accordance with various aspects and embodiments of the disclosed subject matter. The DPMC 102 can analyze, or the DPMC 102 can employ the character recognition component 124 to analyze, the document image 600 to identify an area of the document image 600 that contains visual content 602 and another area of the document image 600 that contains textual information 604. Based at least in part on the results of the analysis of the document image 600, the DPMC 102 and/or the character recognition component 124 can isolate and/or partition the visual content 602 from the textual information 604 of the document image 600.

The DPMC 102 can control operation of the character recognition component 124 and the associated character recognition application, and/or other components (e.g., the SGC component 126) and associated applications, to process (e.g., perform translation and extraction of textual information on) the other area of the document image 600 that contains the textual information 604, while disregarding and not processing the area of the document image 600 that contains the visual content. If it is not desired to maintain the visual content in the processed document, the DPMC 102 can control processing of the document image 600 to generate an electronic textual document that does not include the visual content 602. If it is desired to maintain the visual content in the processed document, the DPMC 102 can control processing of the document image 600, including controlling operations performed by one or more components and associated applications (e.g., component(s) and associated application(s) that can process visual content), to process (e.g., separately process) the visual content 602 located in the other area of the document image 600 (e.g., before or after processing relating to the textual information 604; or in parallel with such processing relating to the textual information 604).

In some embodiments, if the DPMC 102 or other component (e.g., orientation component 122) determine that the visual content 602 is uniformly shaped (e.g., square or rectangular) and is aligned with a side of the physical document that was scanned or photographed to generate the document image 600, the DPMC 102 or the other component (e.g., orientation component 122) can utilize the orientation of the visual content 602 in the document image 600 to facilitate determining an amount of skew of the document image 600 from a desired defined angle (e.g., angle or axis, such as an x-axis or y-axis) and rotating the document image 600 to reduce, minimize, or eliminate such skewing of the document image 600, based at least in part on the orientation of the visual content 602 (e.g., the orientation of the visual content 602 can be adjusted to have a side of the visual content 602 align with the desired defined angle).

Figure 7:
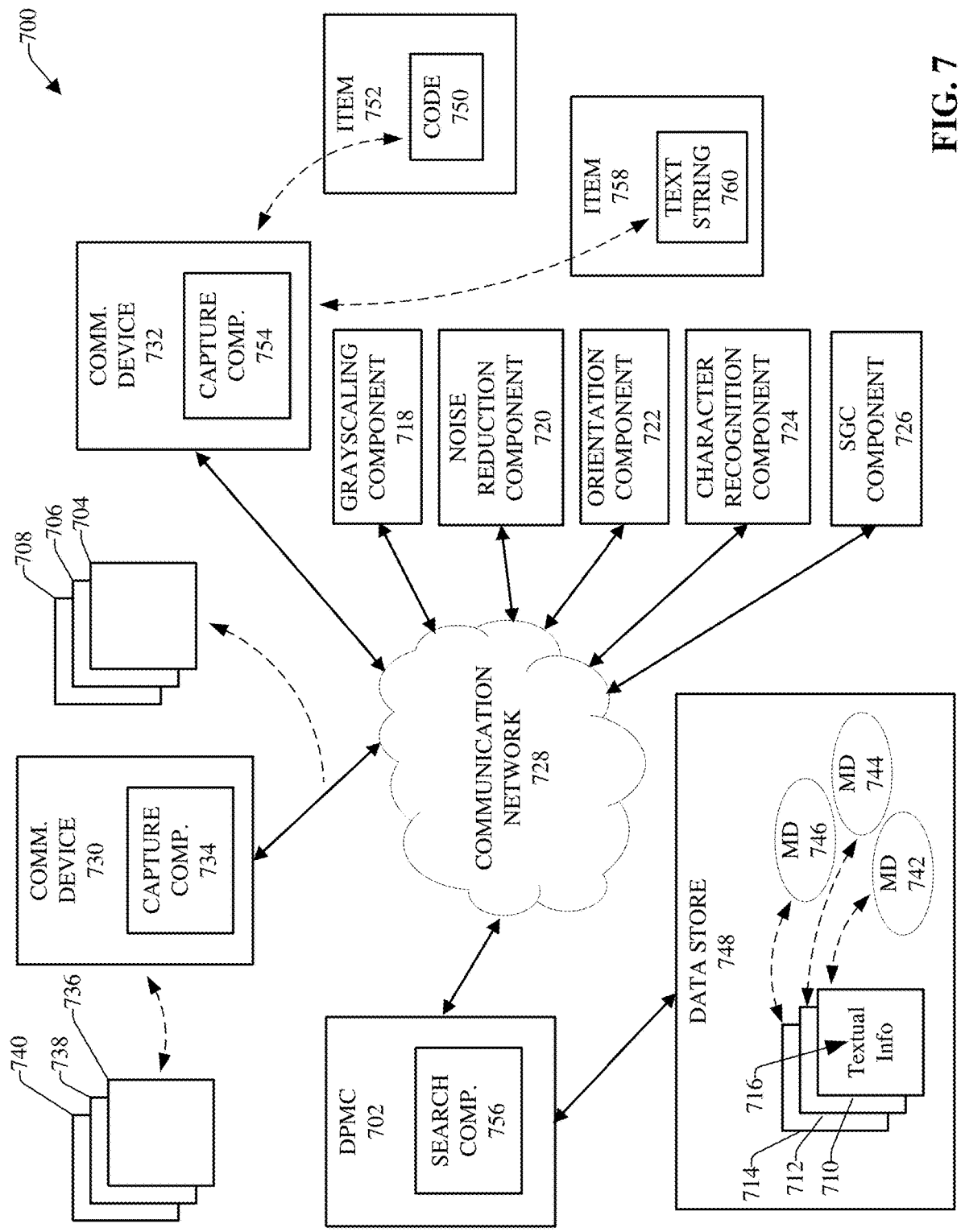
FIG. 7 illustrates a block diagram of an example, non-limiting system that can desirably translate received document images to generate electronic textual documents comprising editable and searchable textual information, store the electronic textual documents and associated metadata in a data store, and process searches for electronic textual documents in the data store, in accordance with various aspects and embodiments of the disclosed subject matter.

FIG. 7 illustrates a block diagram of an example, non-limiting system 700 that can desirably (e.g., accurately and efficiently) translate received document images to generate electronic textual documents comprising editable and searchable textual information, store the electronic textual documents and associated metadata in a data store, and process searches for electronic textual documents in the data store, in accordance with various aspects and embodiments of the disclosed subject matter. The system 700 can comprise a DPMC 702, document images 704, 706, and 708, electronic textual documents 710, 712, and 714 (including respective extracted textual information, such as textual information (textual info) 716 of electronic textual document 710), grayscaling component 718 (and associated grayscaling application), noise reduction component 720 (and associated noise reduction application), orientation component 722 (and associated orientation application), character recognition component 724 (and associated character recognition application), and SGC component 726 (and associated spelling and grammar checking application). Such components of the system 700 each can be the same as or similar to, and/or can comprise the same or similar functionality as, respective components (e.g., respectively named components), such as more fully described herein.

The system 700 can comprise a communication network 728 and communication devices, such as, for example, communication device 730 (COMM. DEVICE 730) and/or communication device 732 (COMM. DEVICE 732), that can be connected to the communication network 728 via a wireless or wireline communication connection. A communication device (e.g., 730 or 732) also can be referred to as, for example, a device, a mobile device, or a mobile communication device. The term "communication device" can be interchangeable with (or include) a UE or other terminology. A communication device (or UE, device, . . . ) can refer to any type of wireless device that can communicate with a radio network node in a cellular or mobile communication system of the communication network 728, or can refer to a device that can be connected to the communication network 728 via a wireline communication connection. Examples of communication devices (e.g., 730 or 732) can include, but are not limited to, a cellular and/or smart phone, a mobile terminal, a scanner or multi-purpose printer/scanner device, a computer (e.g., a laptop embedded equipment (LEE), a laptop mounted equipment (LME), or other type of computer), a device to device (D2D) UE, a machine type UE or a UE capable of machine to machine (M2M) communication, a Personal Digital Assistant (PDA), a tablet or pad (e.g., an electronic tablet or pad), a smart meter (e.g., a smart utility meter), an electronic gaming device, electronic eyeglasses, headwear, or bodywear (e.g., electronic eyeglasses, headwear, or bodywear having wireless communication functionality), an appliance (e.g., a toaster, a coffee maker, a refrigerator, or an oven, . . . , having wireless communication functionality), a device associated or integrated with a vehicle (e.g., automobile, airplane, bus, train, or ship, . . . ), a drone having wireless communication functionality, a home or building automation device (e.g., security device, climate control device, lighting control device, . . . ), an industrial or manufacturing related device, and/or any other type of communication devices (e.g., other types of Internet of Things (IoTs)).

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data plus speech can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

The communication network 728 can comprise a core network that can operate to enable wireless communication between devices or components (e.g., between communication device 730 and the DPMC 702; between the DPMC 702 and the orientation component 722; between communication device 730 and communication device 732; . . . ) and/or between a communication device (e.g., 730) and the communication network 728. The communication network 728 can comprise various components, such as network (NW) nodes e.g., radio network nodes) that can be part of the communication network 728 to facilitate communication of information between devices or components (e.g., between communication device 730 and the DPMC 702; between the DPMC 702 and the orientation component 722; between communication device 730 and communication device 732; . . . ) that can be associated with (e.g., communicatively connected to) the communication network 728. In some embodiments, the communication network 728 can employ Multiple Input, Multiple Output (MIMO) technology to facilitate data communications between devices (e.g., network devices, communication devices, . . . ) associated with the communication network 728.

As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices (e.g., 730, 732, . . . ) and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In fifth generation (5G) cellular network technology terminology, the network nodes can be referred to as gNodeB (e.g., gNB) devices. Network nodes also can comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, TRPs, and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like. In accordance with various embodiments, a network node can be, can comprise, or can be associated with (e.g., communicatively connected to) a network device of the communication network 728.

In some embodiments, the DPMC 702 can be connected (e.g., communicatively connected) to various document processing components, such as the grayscaling component 718, noise reduction component 720, orientation component 722, character recognition component 724, and/or SGC component 726 (and respectively associated applications) via the communication network 728 (as depicted in FIG. 7). In other embodiments, the DPMC 702 can be connected (e.g., communicatively connected) to the various document processing components, such as the grayscaling component 718, noise reduction component 720, orientation component 722, character recognition component 724, and/or SGC component 726 (and respectively associated applications) via another connection (e.g., a direct or non-network communication connection).

The communication device 730, employing a capture component (CAPTURE COMP.) 734 (e.g., a camera or scanner) can scan or photograph various documents (e.g., physical documents), such as, for example, document 736, document 738, and document 740, to generate corresponding document images, such as, for example, document image 704, document image 706, and document image 708. The communication device 730 can communicate the document images (e.g., 704, 706, and/or 708) to the DPMC 702 via the communication network 728.

The DPMC 702 or another component associated with the DPMC 702 can receive the document images (e.g., 704, 706, and/or 708). The DPMC 702 can control operations of the various document processing components, such as the grayscaling component 718, noise reduction component 720, orientation component 722, character recognition component 724, and/or SGC component 726 (and respectively associated applications) to perform desired pre-processing (e.g., grayscaling, noise reduction, and/or skew reduction, . . . ), translation and textual information extraction, and/or post-processing (e.g., spelling and grammar check) of the document images (e.g., 704, 706, and/or 708) to generate the electronic textual documents (e.g., 710, 712, and/or 714), in accordance with the defined document processing criteria, as more fully described herein. The DPMC 702 also can associated respective metadata, including document identifiers, with the respective electronic textual documents (e.g., 710, 712, and/or 714) to facilitate identifying and/or retrieving the respective electronic textual documents. For instance, the DPMC 702 can associate (e.g., link, attach, or otherwise associate) metadata 742 (MD 742), comprising a first document identifier, with the electronic textual document 710, metadata 744 (MD 744), comprising a second document identifier, with the electronic textual document 712, and metadata 746 (MD 746), comprising a third document identifier, with the electronic textual document 714.

The system 700 also can comprise a data store 748 that can store information, including electronic textual documents and associated metadata. The DPMC 702 can store the electronic textual documents (e.g., 710, 712, and/or 714) and respectively associated metadata (e.g., 742, 744, and/or 746) in the data store 748.

In some embodiments, the DPMC 702 or another component of the system 700 also can incorporate or encode the respective document identifiers of the respective electronic textual documents (e.g., 710, 712, and/or 714) into respective codes that can be associated with or attached to devices, products, or other items that are determined to be related to the respective electronic textual documents (e.g., 710, 712, and/or 714). For instance, the DPMC 702 or another component of the system 700 can incorporate or encode the first document identifier associated with the electronic textual document 710 into a code 750 (e.g., a bar code, a QR code, or an RFID) that can be associated with (e.g., attached to) an item 752 (e.g., device, product, or other item) that is determined to be related to the electronic textual document 710. For example, the item 752 can be a device (e.g., a network device) and the electronic textual document 710 can be or can comprise a contract (e.g., vendor or service contract), device specifications, a device user manual, or other device-related information relating to the item 752. The code 750, comprising the first document identifier, can be associated with the item 752. A user can use the communication device 732, employing a capture component 754 (e.g., camera or scanner) to capture or scan the code 750, and the code 750 and/or the first document identifier can be communicated by the communication device 732 to the DPMC 702 via the communication network 728. In response, the DPMC 702, employing a search component 756 (SEARCH COMP. 756), can decode or recover the first document identifier from the code 750 (if the communication device 732 has not already done so), and the DPMC 702, employing the search component 756, can search the data store 748 to locate and/or retrieve the metadata (e.g., metadata 742 comprising the first document identifier) and associated electronic textual document (e.g., electronic textual document 710) in or from the data store 748 based at least in part on the received code 750 and/or first document identifier. The DPMC 702 can communicate the electronic textual document 710, and/or information (e.g., search result information or summary information) relating to the electronic textual document 710, to the communication device 732 via the communication network 728.

As another example, a textual string can be employed as a document identifier to facilitate identifying an electronic textual document that is related to an item. For instance, an item 758, which can be a device (e.g., a wire used in a network) can comprise or be associated with a textual string 760 (TEXT STRING 760), wherein the textual string 760 can comprise, for example, manufacturer information, model information, serial number, or other textual data relating to the item 758, which can be used to facilitate identifying the item 758 as well as other information (e.g., an electronic textual document(s)) that can be related to the item 758. A user can use the communication device 732, employing the capture component 754, to capture or scan the textual string 760, and the textual string 760 or an image of the textual string 760 can be communicated by the communication device 732 to the DPMC 702 via the communication network 728. In response, the DPMC 702, employing the search component 756, can analyze the textual string 760, and, based at least in part on the results of such analysis, can determine or identify relevant information (e.g., manufacturer information, model information, serial number, or other textual data) relating to the item 758. The metadata (e.g., metadata 744) associated with an electronic textual document (e.g., electronic textual document 712) can comprise such relevant information relating to the item 758. The DPMC 702, employing the search component 756, can search the data store 748 to locate and/or retrieve the metadata (e.g., metadata 744) and associated electronic textual document (e.g., electronic textual document 712) in or from the data store 748 based at least in part on the textual string 760. The DPMC 702 can communicate the electronic textual document 712, and/or information (e.g., search result information or summary information) relating to the electronic textual document 712, to the communication device 732 via the communication network 728. So, as one non-limiting example, if the user (e.g., a service technician) associated with a service provider is working on wires associated with a network and desires to know which particular wires of the wires the user is supposed to service or check (as opposed to other wires that are serviced or owned by another service provider), the user can use the communication device 732 to capture or scan a textual string (e.g., textual string 760) on each of one or more wires (e.g., item 758) to have the DPMC 702 identify which of the wires are associated with the service provider and are to be serviced by the user, and which of the wires are not associated with that service provider, and/or identify and provide documentation (e.g., electronic textual documents, or information relating thereto) relating to the wires associated with the service provider to the communication device of the user, based at least in part on the textual string.

As still another example, the DPMC 702, employing the search component 756, can process search queries received from a communication device, and can provide information (e.g., electronic textual documents or information relating thereto) that is responsive to the search queries. For instance, a user can use the communication device 732 to enter a search query comprising one or more search terms (e.g., keywords), and the communication device 732 can communicate the search query to the DPMC 702 via the communication network 728. Using the one or more search terms of the search query and/or other search terms determined by the search component 756, the search component 756 can search the data store 748, including searching the respective textual information (e.g., 716) of the respective electronic textual documents (e.g., 710, 712, 714, . . . ) stored in the data store 748, to identify one or more of the electronic textual documents that contain the one or more search terms (or the other search terms) and are thus determined to be responsive to the search query. For instance, the search component 756 can determine which electronic textual documents in the data store 748 contain textual information (e.g., 716) that matches one or more of the search terms of the query (or the other search terms). The search component 756 can generate search results comprising or identifying the one or more electronic textual documents that are determined to be responsive to the search query. The search component 756 also can rank respective search result items of the search results or rank the respectively associated electronic textual documents that are associated with the respective search result items, based at least in part on a determination by the search component 756 of the relative responsiveness of the respective electronic textual documents to the search query (e.g., the relative levels of matching of the respective textual information of the respective electronic textual documents to the one or more search terms of the search query (or the other search terms)). With regard to the other search terms, the other search terms determined and generated by the search component 756 can comprise supplemental search terms determined by the search component 756 based at least in part on the one or more search terms in the search query, wherein the other search terms can comprise, for example, a plural version of a search term of the search query that is in singular form (or vice versa), an equivalent or synonymous term to a search term of the search query (e.g., "two" can be added as another search term for the search term "2"; "cable" can be added as a synonymous search term for the search term "wire"), and/or an abbreviation or acronym of a search term or phrase (or a full search term or phrase for a search term that is an abbreviation or acronym), etc.

The DPMC 702 can communicate the search results, comprising the one or more electronic textual documents identified by the search component 756 and/or information (e.g., search results, summary, or hyperlinks) relating to the one or more electronic textual documents, to the communication device 732, via the communication network 728, for presentation to the user.

Figure 8:
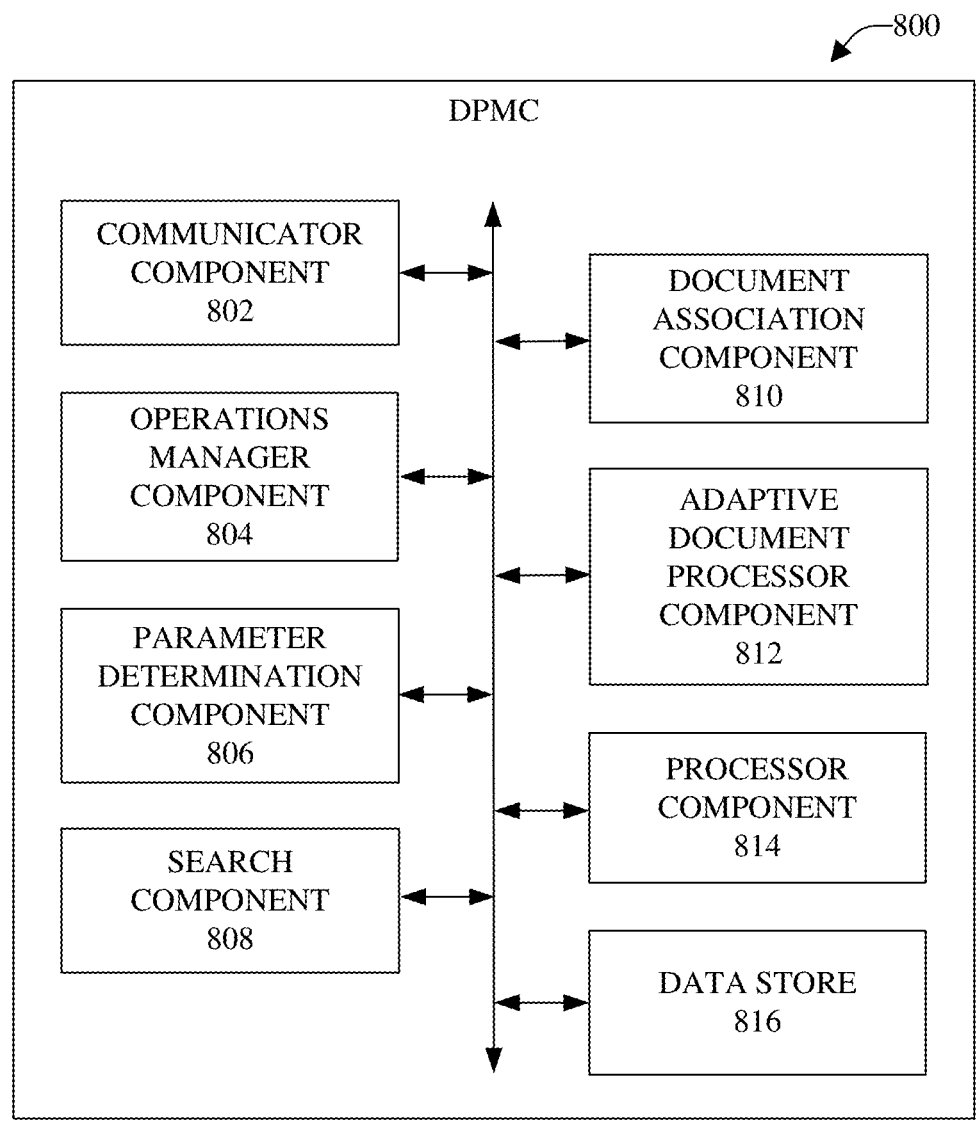
FIG. 8 depicts a block diagram of an example, non-limiting document processing management component (DPMC) that can control pre-processing, translation, and post-processing of documents, in accordance with various aspects and embodiments of the disclosed subject matter.

FIG. 8 depicts a block diagram of an example, non-limiting DPMC 800 that can control pre-processing, translation, and post-processing of documents, in accordance with various aspects and embodiments of the disclosed subject matter. The DPMC 800 can comprise a communicator component 802, an operations manager component 804, a parameter determination component 806, a search component 808, a document association component 810, and an adaptive document processor component 812. The communicator component 802 can communicate or facilitate communication of information to devices or components (e.g., communicating with various components (e.g., grayscaling component, noise reduction component, orientation component, . . . ) and associated applications that are associated with the DPMC 800, communicating electronic textual documents, or information relating thereto, to communication devices associated with the DPMC 800 and/or the communication network, . . . ), and can receive information from the other devices or components (e.g., receiving data, document images, codes, textual strings, or search queries, from communication devices, or receiving data (e.g., pre-processed document images) from the various components and associated applications, . . . ).

The operations manager component 804 can control (e.g., manage) operations associated with the DPMC 800. For example, the operations manager component 804 can facilitate generating instructions to have components (e.g., grayscaling component, noise reduction component, and/or orientation component, . . . ; communicator component 802, parameter determination component 806, search component 808, document association component 810, and/or an adaptive document processor component 812, . . . ) of or associated with the DPMC 800 perform operations, and can communicate respective instructions to such respective components of or associated with the DPMC 800 to facilitate performance of operations by the respective components of or associated with the DPMC 800 based at least in part on the instructions, in accordance with the defined document processing criteria and the defined document processing algorithm(s) (e.g., document processing algorithms, including adaptive thresholding algorithms, as disclosed, defined, recited, or indicated herein by the methods, systems, and techniques described herein). The operations manager component 804 also can facilitate controlling data flow between the respective components of the DPMC 800 and controlling data flow between the DPMC 800 and another component(s) or device(s) (e.g., devices or components, such as the grayscaling component, noise reduction component, and/or orientation component, . . . ) associated with (e.g., connected to) the DPMC 800.

The parameter determination component 806 can determine (and set, indicate, and/or specify) parameters, including threshold parameters, and including determining whether to modify parameters, utilized for respective applications (e.g., grayscaling application, noise reduction application, orientation application, character recognition application, and/or SGC application, . . . ), based at least in part on document processing conditions or the status of processing a document image, features identified in the document image, in accordance with the defined document processing criteria, as more fully described herein. For example, the parameter determination component 806 can determine and set one or more parameters (e.g., lower threshold parameter value, high threshold parameter value, and/or aperture size parameter value associated with edge detection (e.g., canny edge detection); and/or distance resolution parameter, angle resolution parameter, accumulator threshold parameter, minimum line length parameter, and/or maximum line gap parameter associated with drawing hue lines) for an orientation application in connection with rotating a document image to reduce, minimize, or eliminate an amount of skew of the document image, in accordance with the defined document processing criteria and associated document processing algorithm.

The search component 808 can perform searches of a data store (e.g., data store 816), electronic textual documents and/or metadata associated with the electronic textual documents, based at least in part on one or more search terms in a search query (and/or other supplemental search terms, as determined by the search component 808), respective document identifiers associated with respective electronic textual documents, a code (e.g., a code associated with an item), or a textual string (e.g., a textual string associated with an item), to identify one or more electronic textual documents, and/or information relating thereto, that can be related to or responsive to the search query, document identifier, code, or textual string, as more fully described herein. The search component 808 also can determine and utilize supplemental search terms based at least in part on the one or more search terms in the search query, as more fully described herein.

The other search terms can comprise, for example, a plural version of a search term of the search query that is in singular form (or a singular version of a search term that is in plural form), an equivalent or synonymous term to a search term of the search query, and/or an abbreviation or acronym of a search term or phrase (or a full search term or phrase for a search term that is an abbreviation or acronym), etc.

The document association component 810 can associate (e.g., link, map, or otherwise associate) respective metadata with respective electronic textual documents, wherein the metadata can comprise, for example, a document identifier and/or information (e.g., manufacturer information, model information, serial number, service provider information, or other textual data) relating to an item (e.g., device, product, or other item) that is related to a particular electronic textual document(s). The document association component 810 also can determine, generate, or facilitate generating respective codes (e.g., bar code, QR code, or RFID) that can comprise (e.g., can encode or incorporate) respective document identifiers associated with respective electronic textual documents. The respective codes can be associated with (e.g., linked to, attached to, or otherwise associated with) respective items (e.g., devices, products, or other items). A user can use a capture component of a communication device to capture (e.g., capture an image of) or scan a code associated with an item, and the code or the document identifier associated with the code can be communicated to the DPMC 800. In response, the DPMC 800 can decode the code to retrieve the document identifier, or can receive the document identifier, and can use the document identifier, by comparing the document identifier to the respective metadata associated with the respective electronic textual documents, to identify and locate (e.g., in the data store 816) the electronic textual document(s) associated with the document identifier. The DPMC 800, employing the communicator component 802, can communicate the electronic textual document(s), or information (e.g., search results, summary, or hyperlinks) relating thereto, to the communication device.

The adaptive document processor component 812 can coordinate with the parameter determination component 806 and/or other components of the DPMC 800 and/or applications (e.g., grayscaling application, noise reduction application, orientation application, character recognition application, and/or SGC application, . . . ) associated with the DPMC 800 to facilitate adaptively determining and setting parameters, including threshold parameters, to facilitate desirably pre-processing (e.g., grayscaling, noise reducing, and/or de-skewing) document images, translating document images (e.g., pre-processed document images), and/or post-processing document images, based at least in part on the results of analyzing current processing of document images and/or historical processing of document images, in accordance with the defined document processing criteria. For instance, based at least in part on the results of analyzing current processing of document images and/or historical processing of document images, the adaptive document processor component 812 can determine or learn (e.g., by applying machine learning or artificial intelligence (AI) techniques or algorithms) that, with regard to certain types of document images (e.g., document images having certain features), certain parameter values can provide more desirable (e.g., improved, better, or enhanced) pre-processing of document images or translating of pre-processed document images than other parameter values that otherwise typically can be used to perform the pre-processing of document images or translating of pre-processed document images, in accordance with the defined document processing criteria.

The adaptive document processor component 812 can adapt the parameters to set or facilitate setting such certain parameter values when such certain types of document images are being pre-processed or translated by the DPMC 800 and associated applications.

The DPMC 800 also can comprise a processor component 814 that can work in conjunction with the other components (e.g., communicator component 802, parameter determination component 806, search component 808, document association component 810, and/or an adaptive document processor component 812, and data store 816) to facilitate performing the various functions of the DPMC 800. The processor component 814 can employ one or more processors, microprocessors, or controllers that can process data, such as information relating to physical documents, document images of physical documents, electronic textual documents, applications, parameters, metadata, document identifiers, codes, textual strings, communication devices, policies and rules, users, services, defined document processing criteria, traffic flows, signaling, algorithms (e.g., document processing algorithm(s), mapping algorithm(s), . . . ), protocols, interfaces, tools, and/or other information, to facilitate operation of the DPMC 800, as more fully disclosed herein, and control data flow between the DPMC 800 and other components (e.g., network components of or associated with the communication network, communication devices, respective document processing components (e.g., grayscaling component, noise reduction component, orientation component, and/or character recognition component, . . . ) and respectively associated applications, . . . ) associated with the DPMC 800.

The DPMC 800 further can include the data store 816 that can store data structures (e.g., user data, metadata), code structure(s) (e.g., modules, objects, hashes, classes, procedures) or instructions, information relating to physical documents, document images of physical documents, electronic textual documents, applications, parameters, metadata, document identifiers, codes, textual strings, communication devices, policies and rules, users, services, defined document processing criteria, traffic flows, signaling, algorithms (e.g., document processing algorithm(s), mapping algorithm(s), . . . ), protocols, interfaces, tools, and/or other information, to facilitate controlling operations associated with the DPMC 800. In an aspect, the processor component 814 can be functionally coupled (e.g., through a memory bus) to the data store 816 in order to store and retrieve information desired to operate and/or confer functionality, at least in part, to the DPMC 800 and its components, and the data store 816, etc., and/or substantially any other operational aspects of the DPMC 800.

It should be appreciated that the data store 816 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 9:
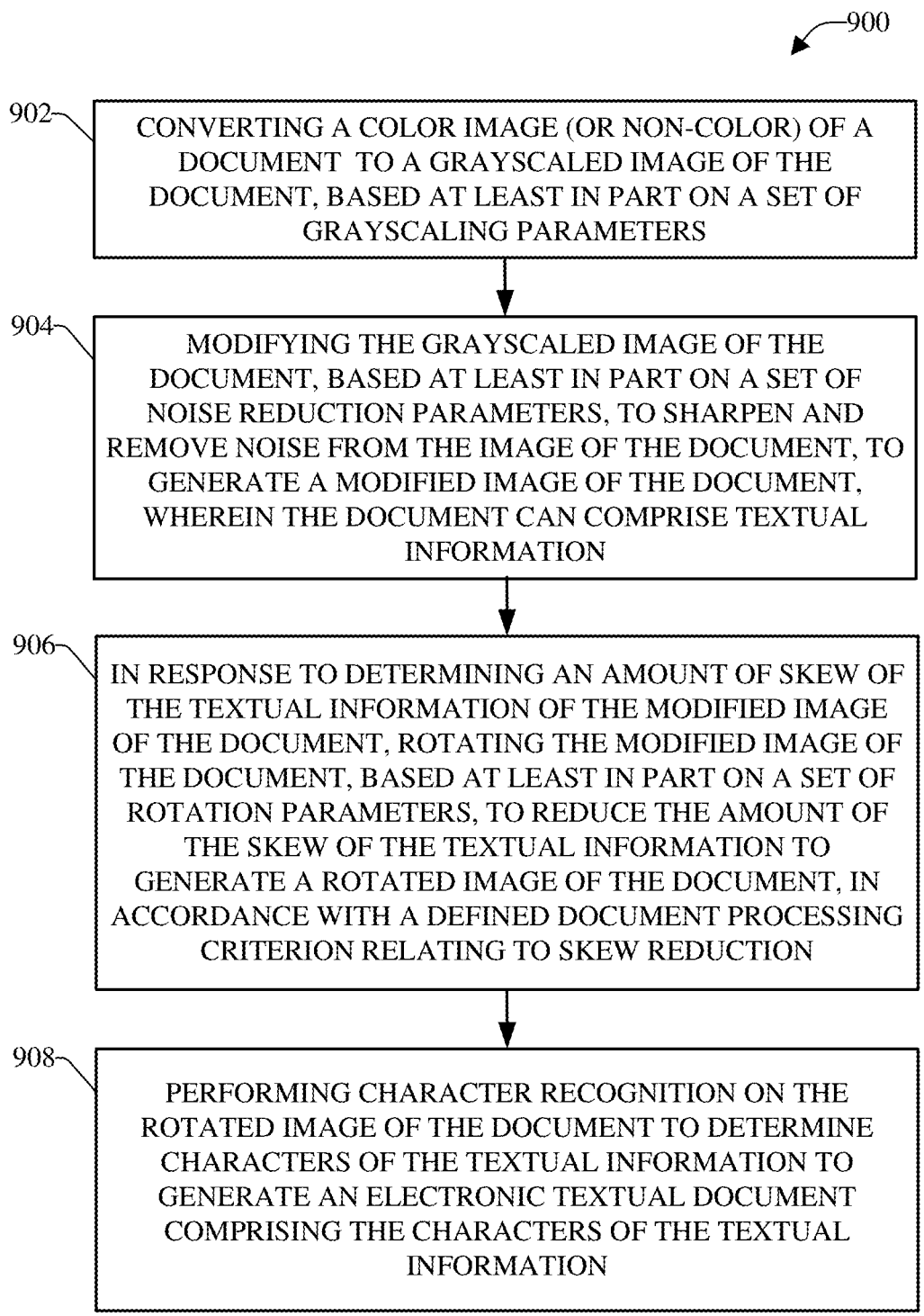
FIG. 9 depicts a flow diagram of an example, non-limiting method that can desirably translate an image of a document into an electronic textual document comprising editable and searchable textual information, in accordance with various aspects and embodiments of the disclosed subject matter.
Figure 10:
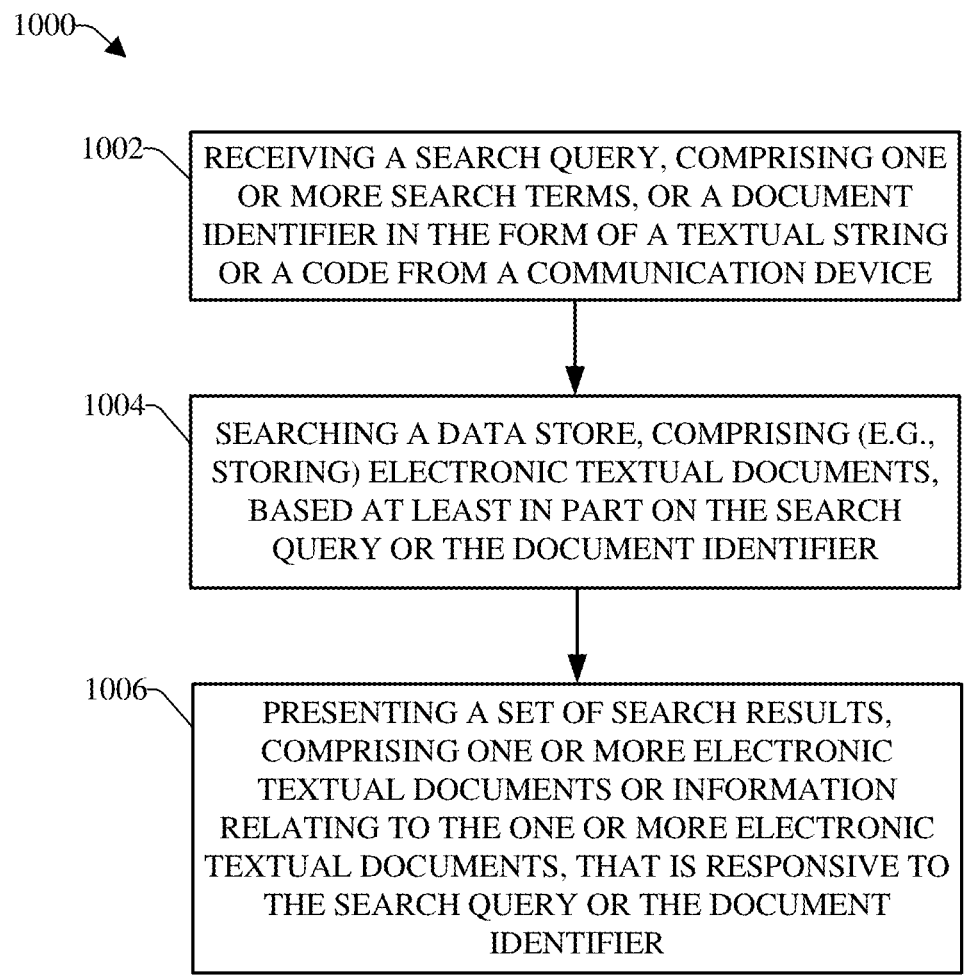
FIG. 10 depicts a flow diagram of an example, non-limiting method that can retrieve an electronic textual document, comprising editable and searchable textual information, from a data store in response to a search query or a document identifier, in accordance with various aspects and embodiments of the disclosed subject matter.

In view of the example systems and/or devices described herein, example methods that can be implemented in accordance with the disclosed subject matter can be further appreciated with reference to flowchart in FIGS. 9-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 9 illustrates a flow diagram of an example, non-limiting method 900 that can desirably (e.g., accurately and efficiently) translate an image of a document into an electronic textual document comprising editable and searchable textual information, in accordance with various aspects and embodiments of the disclosed subject matter. The method 900 can be implemented by a system that can comprise a DPMC, a processor component, a data store, and/or another component(s). Alternatively, or additionally, a machine-readable storage medium can comprise executable instructions that, when executed by a processor, facilitate performance of the operations of the method 900.

At 902, a color image (or non-color) of a document can be converted to a grayscaled image of the document, based at least in part on a set of grayscaling parameters. The DPMC, employing a grayscaling application, can convert or facilitate converting (e.g., via the grayscaling application) the color image (or non-color) of the document to the grayscaled image of the document, based at least in part on the set of grayscaling parameters, which can comprise one or more threshold grayscaling parameter values.

At 904, the grayscaled image of the document can be modified, based at least in part on a set of noise reduction parameters, to sharpen and remove noise from the image of the document, to generate a modified image of the document, wherein the document can comprise textual information. The DPMC, employing a noise reduction application, can modify or facilitate modifying (e.g., via the noise reduction application) the grayscaled image of the document to sharpen and remove noise from the grayscaled image of the document to generate the modified image of the document, based at least in part on the set of noise reduction parameters, which can comprise one or more threshold noise reduction parameter values.

At 906, in response to determining an amount of skew of the textual information of the modified image of the document, the modified image of the document can be rotated, based at least in part on a set of rotation parameters, to reduce (e.g., minimize, eliminate, or substantially eliminate) the amount of the skew of the textual information to generate a rotated image of the document, in accordance with a defined document processing criterion relating to skew reduction. The DPMC, employing an orientation application, can determine whether the modified image (e.g. the textual information of the modified image) of the document is skewed from a defined angle (e.g., has an orientation that is skewed from the desired defined angle). In response to the DPMC and/or orientation application determining that the modified image is skewed from the defined angle, and determining the amount of skew of the textual information of the modified image of the document from the defined angle, the DPMC can rotate or facilitate rotating (e.g., via the orientation application) the modified image of the document, based at least in part on the set of rotation parameters, which can comprise one or more threshold rotation parameter values, to reduce (e.g., minimize, eliminate, or substantially eliminate) the amount of the skew of the textual information to generate the rotated (e.g., orientation-corrected) image of the document, in accordance with the defined document processing criterion relating to skew reduction.

At 908, character recognition can be performed on the rotated image of the document to determine characters of the textual information to generate an electronic textual document comprising the characters of the textual information. The DPMC, employing a character recognition (e.g., OCR) application, can determine or facilitate determining (e.g., via the character recognition application) the characters (e.g., letters, numbers, symbols) of the textual information of the document, based at least in part on a set of character recognition parameters, which can comprise one or more threshold character recognition parameter values, and can generate the electronic textual document that can comprise the characters of the textual information. For example, the DPMC, employing the character recognition application, can extract or facilitate extracting the text (e.g., the characters) of the textual information of the document from the rotated image of the document based at least in part on a set of character recognition parameters.

As desired, the DPMC, employing one or more other applications (e.g., spell and grammar check application) can perform or facilitate performing other document processing, such as, for example, performing or facilitating performing spell checking and grammar checking of the textual information of the electronic textual document, and/or the DPMC can associate metadata (e.g., an identifier, such as a textual string or a code value associated with a code, such as a bar code, QR code, or RFID) with the electronic textual document. The DPMC can store electronic textual documents and respectively associated metadata in a data store, as described herein.

FIG. 10 depicts a flow diagram of an example, non-limiting method 1000 that can retrieve an electronic textual document, comprising editable and searchable textual information, from a data store in response to a search query or a document identifier, in accordance with various aspects and embodiments of the disclosed subject matter. The method 1000 can be implemented by a system that can comprise a DPMC, a processor component, a data store, and/or another component(s). Alternatively, or additionally, a machine-readable storage medium can comprise executable instructions that, when executed by a processor, facilitate performance of the operations of the method 1000.

At 1002, a search query, comprising one or more search terms, or a document identifier in the form of a textual string or a code, can be received from a communication device. A user can use the communication device to enter the search query, comprising one or more search terms (e.g., keywords), or can use the communication device to scan or capture (e.g., capture an image of) the textual string or the code (e.g., bar code, QR code, or RFID) from a device, product, or other item on which the textual string or the code is located or attached. The communication device can communicate the search query or the document identifier to the DPMC, which can receive such search query or document identifier.

At 1004, a data store, comprising (e.g., storing) electronic textual documents, can be searched based at least in part on the search query or the document identifier. The DPMC can search the electronic textual documents stored in the data store, based at least in part on the one or more search terms (or supplemental search terms determined by the DPMC), to determine whether one or more of the electronic textual documents contain the one or more search terms (or the supplemental search terms). Alternatively, the DPMC can search the respective electronic textual documents or respectively associated metadata stored in the data store, based at least in part on the document identifier (e.g., the textual string or the code), to determine whether one or more of the electronic textual documents are associated with the document identifier.

At 1006, a set of search results, comprising one or more electronic textual documents or information relating to the one or more electronic textual documents, that is responsive to the search query or the document identifier can be presented. The DPMC can generate the set of search results and can present (e.g., communicate) the set of search results to the communication device. The set of search results can comprise the one or more electronic textual documents that are responsive to the search query or the document identifier, or can comprise information, such as one or more respective links (e.g., hyperlinks) to the one or more electronic textual documents, a listing of the one or more electronic textual documents, one or more respective summaries of the one or more electronic textual documents, and/or other desired (e.g., relevant or pertinent) information.

Figure 11:
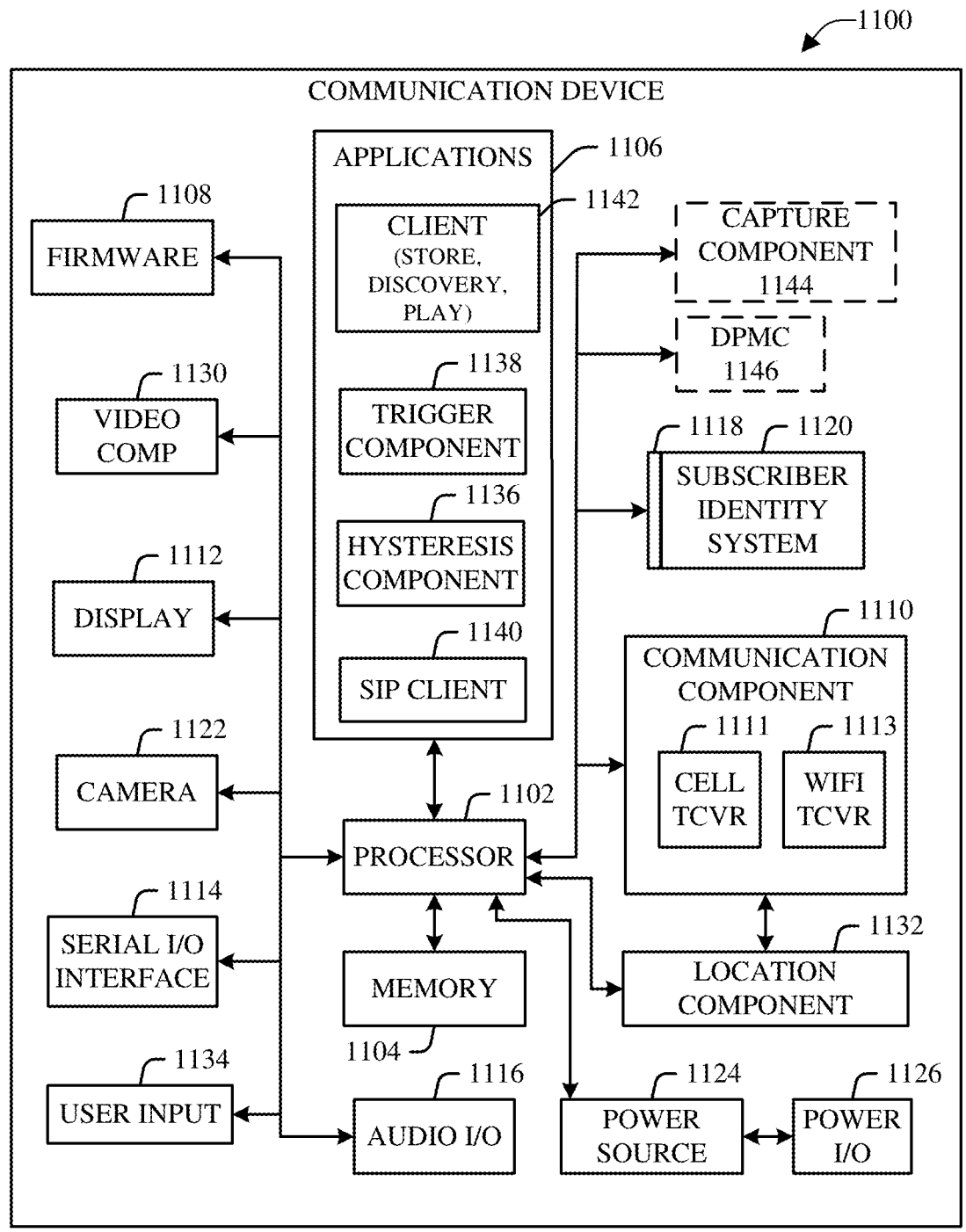
FIG. 11 depicts an example block diagram of an example communication device operable to engage in a system architecture that facilitates wireless communications according to one or more embodiments described herein.

Referring now to FIG. 11, depicted is an example block diagram of an example communication device 1100 (e.g., wireless or mobile phone, electronic pad or tablet, or IoT device, . . . ) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 1100 can include a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the communication device 1100. A communication component 1110 interfaces to the processor 1102 to facilitate wired/ wireless communication with external systems, e.g., cellular networks, VoIP networks, and so on. Here, the communication component 1110 can also include a suitable cellular transceiver 1111 (e.g., a GSM transceiver) and/or an unlicensed transceiver 1113 (e.g., Wi-Fi, WiMax) for corresponding signal communications. The communication device 1100 can be a device such as a cellular telephone, a PDA with mobile communications capabilities, and messaging-centric devices. The communication component 1110 also facilitates communications reception from terrestrial radio networks (e.g., broadcast), digital satellite radio networks, and Internet-based radio services networks.

The communication device 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The communication device 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the communication device 1100, and updated by downloading data and software.

The communication device 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the communication device 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video quotes. The communication device 1100 also includes a power source 1124 in the form of batteries and/or an AC power subsystem, which power source 1124 can interface to an external power system or charging equipment (not shown) by a power I/O component 1126.

The communication device 1100 can also include a video component 1130 for processing video content received and, for recording and transmitting video content. For example, the video component 1130 can facilitate the generation, editing and sharing of video quotes. A location tracking component 1132 facilitates geographically locating the communication device 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the communication device 1100 to support SIP protocols and register the subscriber with the SIP registrar server. The applications 1106 can also include a client 1142 that provides at least the capability of discovery, play and store of multimedia content, for example, music.

The communication device 1100, as indicated above related to the communication component 1110, includes an indoor network radio transceiver 1113 (e.g., Wi-Fi transceiver). This function supports the indoor radio link, such as IEEE 802.11, for the dual-mode GSM device (e.g., communication device 1100). The communication device 1100 can accommodate at least satellite radio services through a device (e.g., handset device) that can combine wireless voice and digital radio chipsets into a single device (e.g., single handheld device).

In some embodiments, the communication device 1100 optionally can comprise a capture component 1144 that can comprise or employ a camera or scanner to capture or scan images, codes (e.g., bar code, QR code, or RFID), or textual strings, as more fully described herein. For example, the capture component 1144 can capture (e.g., capture an image of) or scan a code associated with an item (e.g., device, product, or other item) to facilitate identifying one or more electronic textual documents that are associated with a document identifier(s) associated with (e.g., encoded or incorporated in) the code and are related to the item, as more fully described herein. As another example, the capture component 1144 can capture (e.g., capture an image of) or scan a textual string associated with an item to facilitate identifying the item (e.g., identifying whether the item is associated with an entity) and/or identifying one or more electronic textual documents that are associated with (e.g., related to) the item, as more fully described herein.

In certain embodiments, the communication device 1100 optionally can comprise a DPMC 1146 that can pre-process (e.g., grayscale, reduce or remove noise, de-skew, . . . ) document images of documents (e.g., physical documents), translate the document images (e.g., the pre-processed document images) to extract textual information and generate electronic textual documents comprising the extracted textual information, perform post-processing (e.g., spelling and grammar checking) of electronic textual documents, and/or perform other processing of or operations on or relating to documents, document images, and/or electronic textual documents, as more fully described herein. In connection with processing document images, the DPMC 1146 also can manage the use of and control the operation of various components (e.g., grayscaling component, noise reduction component, orientation component, character recognition component, and/or SGC component, . . . ) and associated applications (e.g., grayscaling application, noise reduction application, orientation application, character recognition application, and/or SGC application, . . . ), as more fully described herein. Such various components (not shown in FIG. 11) and associated applications can reside on the communication device 1100 or can be accessed by the communication device 1100 (and DPMC 1146), for example, via a communication network. The DPMC 1146 also can manage electronic textual documents and associated metadata in a data store (e.g., memory 1104) of or associated with (e.g., communicatively connected to) the communication device 1100.

Figure 12:
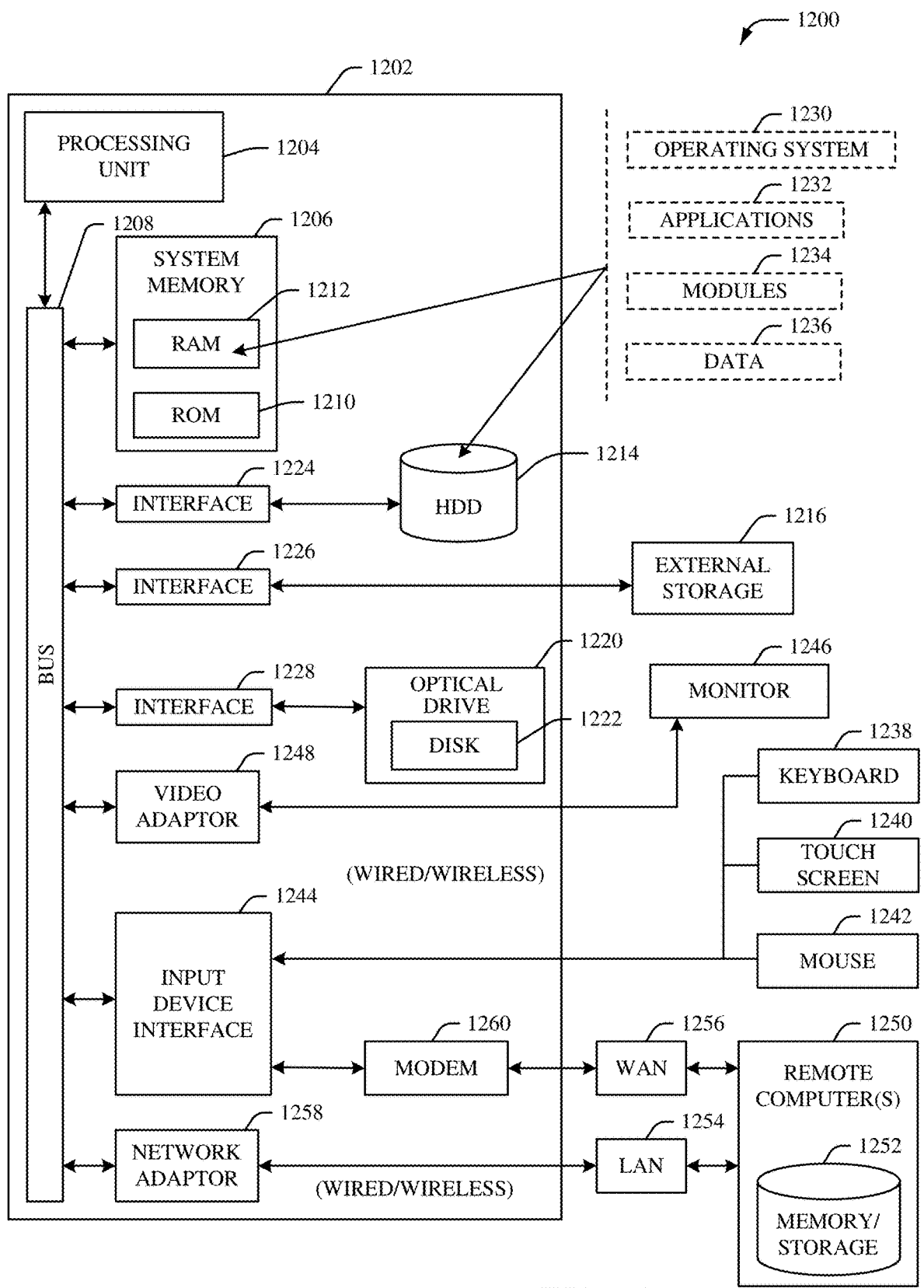
FIG. 12 illustrates an example block diagram of an example computing environment in which the various embodiments of the embodiments described herein can be implemented.

In order to provide additional context for various embodiments described herein, FIG. 12 and the following discussion are intended to provide a brief, general description of a suitable computing environment 1200 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256, e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like can refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "entity," and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise converting a color (or non-color) document image to grayscale, removing noise from a document image, rotating a document image, translating a document image to extract textual information, generating electronic textual documents comprising textual information, performing spelling and grammar checking on textual information of an electronic textual document, searching for electronic textual documents or information relating thereto, transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, the DPMC, a grayscaling component, a noise reduction component, an orientation component, a character recognition component, an SGC component, processors, sensors, antennae, audio and/or visual output devices, other devices, etc.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
modifying, by a system comprising a processor, an image of a document, based on a noise parameter, to sharpen, and remove an item determined to be noise from, the image of the document, to generate a modified image of the document, wherein the document comprises textual information;
in response to determining an amount of skew of the textual information of the modified image of the document, rotating, by the system, the modified image of the document, based on a rotation parameter, to reduce the amount of the skew of the textual information to generate a rotated image of the document, in accordance with a defined document processing criterion relating to skew reduction; and
performing, by the system, character recognition on the rotated image of the document to determine characters of the textual information to generate an electronic textual document comprising the characters of the textual information.

2. The method of claim 1, further comprising:
converting, by the system, a color image of the document to a grayscaled image of the document, based on a grayscaling parameter, wherein the image of the document is the grayscaled image of the document.

3. The method of claim 1, further comprising:
determining, by the system, a group of parameter threshold values based on a group of parameters, in accordance with defined document processing criteria comprising the defined document processing criterion relating to the skew reduction, and wherein the group of parameter threshold values comprises a noise parameter threshold value associated with the noise parameter, a rotation parameter threshold value associated with the rotation parameter, a character recognition parameter threshold value associated with a character recognition parameter, or a grayscaling parameter threshold value associated with a grayscaling parameter; and
setting, by the system, the group of parameter threshold values to facilitate generating the electronic textual document comprising the characters of the textual information.

4. The method of claim 1, wherein the modifying the image of the document, based on the noise parameter, to sharpen, and remove the item determined to be the noise from, the image of the document comprises modifying the image of the document, based on the noise parameter, to sharpen, and remove a group of items determined to be the noise from, the image of the document to generate the modified image of the document, and wherein the group of items determined to be the noise comprises a mark determined to be a non-textual stray mark on the image of the document or a first portion of the image that is determined to be differently colored than a second portion of the image that is determined to be a background area of the document.

5. The method of claim 1, further comprising:
receiving, by the system, a captured image of the document at a first angle with respect to a defined axis, wherein the modified image of the document is at the first angle, wherein the rotating comprises rotating the modified image, based on the rotation parameter, to reduce the amount of the skew of the textual information to generate the rotated image comprising the textual information that is at a second angle that corresponds to the defined axis, and wherein the captured image is captured by scanning or photographing the document.

6. The method of claim 1, further comprising:
performing, by the system, a spell checking operation to correct a misspelling of a word of the textual information of the electronic textual document or a grammar check operation to correct a grammar error in the textual information of the electronic textual document.

7. The method of claim 1, further comprising:
in parallel:
performing, by the system, a first grayscale operation, a first noise-reduction operation, a first skew-reduction operation, or a first character-recognition operation on a first portion of a version of the image of the document; and
performing, by the system, a second grayscale operation, a second noise-reduction operation, a second skew-reduction operation, or a second character-recognition operation on a second portion of the version of the image of the document.

8. The method of claim 1, further comprising:
  storing, by the system, a group of electronic textual documents, comprising the electronic textual document, in a data store;
  receiving, by the system, a search query comprising search information;
  in response to the search query, searching, by the system, the data store, comprising the group of electronic textual documents, based on the search information, to generate a search result responsive to the search query, wherein the search result comprises the electronic textual document, and wherein the searching comprises analyzing respective textual information or respective metadata of respective electronic textual documents of the group of electronic textual documents based on the search information; and
  presenting, by the system, the search result.

9. The method of claim 8, further comprising:
  associating, by the system, the respective metadata with the respective electronic textual documents, including associating metadata with the electronic textual document, wherein the respective metadata comprises respective codes, respective textual strings, or respective identifier images, wherein the receiving the search query comprises receiving the search query from a first device, in response to the first device scanning or photographing a code, a textual string, or an identifier image associated with a second device, wherein the code, the textual string, or the identifier image is the metadata associated with the electronic textual document, and wherein the code is a bar code, a quick response code, or a radio frequency identification code.

10. A system, comprising:
  a processor; and
  a memory that stores executable instructions that, when executed by the processor, facilitate performance of operations, comprising:
  modifying an image of a document, based on a noise parameter, to sharpen, and remove an item determined to be noise from, the image of the document, to generate a modified image of the document, wherein the document comprises textual data;
  in response to determining a deviation of an orientation of the textual data of the modified image of the document from a defined angle, adjusting the orientation of the modified image of the document, based on an orientation parameter, to reduce the deviation of the orientation of the textual data from the defined angle to generate an orientation-corrected image of the document, in accordance with a defined document processing criterion relating to orientation deviation reduction; and
  performing character recognition on the orientation-corrected image of the document to determine characters of the textual data to generate an electronic textual document comprising the characters of the textual data.

11. The system of claim 10, wherein the operations further comprise:
  converting a color image of the document to a grayscaled image of the document, based on a grayscaling parameter, wherein the image of the document is the grayscaled image of the document.

12. The system of claim 11, wherein a noise reduction application is utilized to facilitate the modifying of the image of the document, an orientation application is utilized to facilitate the adjusting of the orientation of the modified image of the document, a character recognition application is utilized to facilitate the performing of the character recognition on the orientation-corrected image of the document, or a grayscaling application is utilized to facilitate the converting of the color image of the document to the grayscaled image of the document, and wherein the noise reduction application, the orientation application, the character recognition application, or the grayscaling application is an open source application.

13. The system of claim 10, wherein the operations further comprise:
  determining a group of parameter threshold values based on a group of parameters, in accordance with defined document processing criteria comprising the defined document processing criterion relating to the orientation deviation reduction, and wherein the group of parameter threshold values comprises a noise parameter threshold value associated with the noise parameter, an orientation parameter threshold value associated with the orientation parameter, a character recognition parameter threshold value associated with a character recognition parameter, or a grayscaling parameter threshold value associated with a grayscaling parameter; and
  applying the group of parameter threshold values to facilitate generating the electronic textual document comprising the characters of the textual data.

14. The system of claim 10, wherein the operations further comprise:
  receiving a captured image of the document at a first angle with respect to the defined axis, wherein the modified image of the document is at the first angle, wherein the adjusting comprises adjusting the orientation of the modified image of the document, based on the orientation parameter, to reduce the deviation of the orientation of the textual data from the defined angle to generate the orientation-corrected image of the document that is at a second angle that is substantially same as the defined axis, and wherein the captured image is captured by scanning or photographing the document.

15. The system of claim 10, wherein the operations further comprise:
  performing a spell checking operation to correct a misspelling of a word of the textual data of the electronic textual document or a grammar check operation to correct a grammar error in the textual data of the electronic textual document.

16. The system of claim 10, wherein the operations further comprise:
  storing a group of electronic textual documents, comprising the electronic textual document, in a data store;
  receiving a search query comprising search information;
  in response to the search query, searching the data store, comprising the group of electronic textual documents, based on the search information, to generate a search result responsive to the search query, wherein the search result comprises the electronic textual document, and wherein the searching comprises analyzing respective textual information or respective metadata of respective electronic textual documents of the group of electronic textual documents based on the search information; and
  presenting the search result.

17. The system of claim 16, wherein the operations further comprise:
  associating the respective metadata with the respective electronic textual documents, including associating metadata with the electronic textual document, wherein the respective metadata comprises respective codes, respective textual strings, or respective identifier images, wherein the receiving the search query comprises receiving the search query from a first device, in response to the first device scanning or photographing a code, a textual string, or an identifier image associated with a second device, wherein the code, the textual string, or the identifier image is the metadata associated with the electronic textual document, and wherein the code is a bar code, a quick response code, or a radio frequency identification code.

18. The system of claim 17, wherein the first device comprises a phone, a scanner, a camera, a computer, an electronic pad, an electronic tablet, electronic eyewear, or electronic bodywear.

19. A non-transitory machine-readable medium, comprising executable instructions that, when executed by a processor, facilitate performance of operations, comprising:

altering an image of a document, based on a noise parameter, to sharpen, and remove an item determined to be noise from, the image of the document, to generate a modified image of the document, wherein the document comprises textual information;

in response to determining an amount of skew of the textual information of the modified image of the document, rotating the modified image of the document, based on a rotation parameter, to reduce the amount of the skew of the textual information to generate a rotated image of the document, in accordance with a defined document processing criterion relating to skew reduction; and translating the rotated image of the document to extract characters of the textual information to generate an electronic textual document comprising the characters of the textual information.

20. The non-transitory machine-readable medium of claim 19, wherein the operations further comprise:

converting a color image of the document to a grayscaled image of the document, based on a grayscaling parameter, wherein the image of the document is the grayscaled image of the document.

* * * * *